US009804891B1

(12) United States Patent
Adalier

(10) Patent No.: US 9,804,891 B1
(45) Date of Patent: Oct. 31, 2017

(54) PARALLELIZING MULTIPLE SIGNING AND VERIFYING OPERATIONS WITHIN A SECURE ROUTING CONTEXT

(71) Applicant: Antara Teknik LLC, Granite Bay, CA (US)

(72) Inventor: Mehmet Yavuz Adalier, Granite Bay, CA (US)

(73) Assignee: Antara Teknik LLC, Granite Bay, CA (US)

( * ) Notice: Subject to any disclaimer, the term of this patent is extended or adjusted under 35 U.S.C. 154(b) by 115 days.

(21) Appl. No.: 15/076,540

(22) Filed: Mar. 21, 2016

Related U.S. Application Data

(60) Provisional application No. 62/136,251, filed on Mar. 20, 2015.

(51) Int. Cl.
| | |
|---|---|
| *G06F 9/46* | (2006.01) |
| *G06F 9/50* | (2006.01) |
| *H04L 29/06* | (2006.01) |
| *H04L 12/721* | (2013.01) |

(52) U.S. Cl.
CPC .......... *G06F 9/5038* (2013.01); *G06F 9/5083* (2013.01); *H04L 45/70* (2013.01); *H04L 63/123* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,259,585 B1* | 9/2012 | S P ...................... | H04L 45/125 370/237 |
| 9,386,037 B1* | 7/2016 | Hunt ................... | H04L 63/1483 |
| 2003/0014665 A1* | 1/2003 | Anderson ........... | H04L 63/0227 726/4 |

(Continued)

OTHER PUBLICATIONS

Adalier, Mehmet, "Efficient and Secure Elliptic Curve Cryptography Implementation of Curve P-256," Jun. 2015, 11 pages.

(Continued)

*Primary Examiner* — Dong Kim
(74) *Attorney, Agent, or Firm* — Patent Law Works LLP

(57) ABSTRACT

A networking device continuously and simultaneously receives multiple sign and verify requests, without a priori knowledge of their quantity, type, sequence, length, input data or frequency. The networking device performs the corresponding signature operations and verification operations according to a rule based configuration. Each received sign and verify request is broken into multiple tasks, which are placed into a task pool with priorities, and disassociated from their originating requests and from other tasks. Multiple execution agents (each one a separate general purpose compute unit with its own memory space) repeatedly and simultaneously processes next available tasks from the pool based on priority. Asynchronous worker routines in the agents can pre-calculate certain values for higher level task processing. The output from completed tasks is placed into a repository, and the results in the repository are processed to fulfill the multiple received requests at network line speed.

20 Claims, 11 Drawing Sheets

(56) References Cited

U.S. PATENT DOCUMENTS

| | | | | |
|---|---|---|---|---|
| 2005/0102414 A1* | 5/2005 | Hares | .................. | H04L 45/00 |
| | | | | 709/232 |
| 2014/0369209 A1* | 12/2014 | Khurshid | ............ | H04L 41/0866 |
| | | | | 370/250 |
| 2015/0207728 A1* | 7/2015 | Gagliano | ................ | H04L 45/44 |
| | | | | 370/254 |
| 2016/0182487 A1* | 6/2016 | Zhu | .................... | H04L 63/0823 |
| | | | | 726/9 |

OTHER PUBLICATIONS

Adalier, Mehmet, "Efficient and Secure ECC Implementation of Curve P-256," Jun. 2015, 14 pages.

* cited by examiner

PARALLELIZING MULTIPLE SIGNING AND VERIFYING OPERATIONS WITHIN A SECURE ROUTING CONTEXT

CROSS-REFERENCES TO RELATED APPLICATIONS

This application claims the benefit of priority under 35 U.S.C. 119(e) to U.S. Application No. 62/136,251, filed Mar. 20, 2105, entitled Parallelizing Multiple Signing and Verifying Operations within a Secure Routing Context, the contents of which are hereby incorporated herein by reference.

GOVERNMENT LICENSE RIGHTS

This invention was made with U.S. Government support under Cooperative Agreement Number 70NANB14H289 awarded by the U.S. Department of Commerce, National Institute of Standards and Technology. The U.S. Government has certain rights in the invention.

TECHNICAL FIELD

This disclosure pertains generally to network router technology and parallel processing, and more specifically to parallelizing multiple signing and verifying operations within a secure routing context.

BACKGROUND

The reliable functioning of the Internet is imperative to the national and economic security of United States, especially as the frequency and complexity of cyber-security threats are increasing significantly. The Internet consists of many core networks of different service providers (e.g., organizations such as enterprises, governments, universities and other educational institutions, etc.) connected by a communication "backbone." An edge router, a type of networking device, is positioned at the edge of core networks, and manages communication routing between core networks over the backbone. Edge routers also provide authenticated access to their corresponding core networks. By contrast, core routers route data packets between hosts within core networks.

A networking device such as a router can be thought of as having a control plane and a data plane. As will be understood by those of ordinary skill in the relevant art, "data plane" and "control plane" are conceptual terms, used in the context of networking to describe the components that perform certain functions in a telecommunications architecture. The control plane is where the logic is executed governing decisions concerning operations such as forwarding, routing and verification. The data plane is where the actual movement of the network traffic occurs. The data plane performs the commands of the control plane. As such, these planes represent collections of functionalities, which can be instantiated as hardware, software, firmware and any combinations thereof as desired. The hardware used for the control plane could be based on general purpose computing units (e.g., CPUs), custom hardware such as FPGAs and ASICs, graphics units used as processing units, or a combination of these. Software Defined Network (SDN) is a dynamic, manageable and adaptable architectural model, which effectively decouples the network control and forwarding functions. It further provides the functionality to enable direct and remote network control while enabling the underlying infrastructure to be abstracted for applications and network services. SND devices use general purpose computing units and implement the various control plane functionality using updateable software modules.

Edge routers typically run implementations of the Border Gateway Protocol (BGP). BGP, being a scalable protocol, can also be used with other types of networking devices, such as core routers, top of the rack routers and Virtual Private Network (VPN) appliances to route a variety of data. The currently deployed version of BGP, which was last updated in 2006, does not include provisions for security features, and is vulnerable to malicious attacks targeting the control plane of the edge router. These attacks can be perpetuated in a number of ways, and could cause significant failures and instability, e.g., perpetuators can deny service, re-route traffic to malicious hosts, and expose network topologies. There have been significant efforts over the years to add robustness to BGP and to provide Best Common Practice (BCP) guidance for the same.

The Internet Engineering Taskforce (IETF) is currently developing BGPSEC (BGP with Security), which is an extension to BGP designed to provide path security for BGP route advertisements. The extension is meant to provide resiliency against route hijacks and Autonomous System (AS) path modifications. Specifically, two mechanisms are being defined: i) route-origin validation; and ii) path validation. As described in RFC 6480, the Resource Public Key Infrastructure (RPKI) provides the initial step used to validate BGP routing data. First, holders of AS number and IP address resources are issued RPKI Resource Certificates, which establish a binding between them and cryptographic keys for digital signature verification. Furthermore, a Route Origination Authorization (ROA), which is a digitally signed object, allows holders of IP address resources to authorize specific Autonomous Systems to originate routes. Edge routers (and other networking devices) running BGPSEC (sometimes referred to as BGPSEC speakers) can use ROAs to ensure that the network device which originated the received route was in fact authorized to originate that route.

Effectively, the BGPSEC router certificate binds an AS number to a public signature verification key. Thus, any BGPSEC speaker intending to send BGP update messages containing the BGPSEC Path to external (eBGP) peers must have a corresponding private key associated with an RPKI router certificate that belongs to the BGPSEC speaker's AS number. When the BGPSEC update message is originated, the BGPSEC_Path_Signatures attribute contains only a single signature. If the receiver of the update intends to propagate the update to an external peer, a new signature is added to the BGPSEC_Path_Signatures attribute, which quickly increases the size of the update messages. Since each BGP update message must be cryptographically signed and verified, BGPSEC requires real-time line-speed cryptographic operations on BGP path announcements. The global Internet BGP Routing Table is approaching 600,000 active BGP entries in the GBP Forwarding Table (FIB) and over 1.5 Million entries in the BGP Routing Table (RIB). Given this large size, as well as the strict time period for re-convergence following router reboots needed to satisfy provider-client Service Level Agreements (SLAs), this additional requirement of BGPSEC causes a major adoption challenge. Most currently deployed edge router control plane hardware simply does not have the processing power to handle BGPSEC's cryptographic-intensive computations.

As background, public key cryptography has become the de facto standard for communications over the Internet and many other forms of communications. Until recently, Internet communications have been secured by the first generation of public key cryptographic algorithms, such as RSA, developed in the 1970s. Newer techniques, such as arithmetic of elliptic curves, have been developed which offer both better performance and higher security than these first generation public key techniques. Elliptic curves offer significant benefits over existing public key algorithms, as one scales security upwards over time to meet the evolving threat posed by eavesdroppers and hackers with access to greater computing resources. For digital signatures, public key cryptography is used to authenticate the origin of data and protect the integrity of that data. For protecting both classified and unclassified National Security information, the National Security Agency (NSA) has decided to move to elliptic curve based public key cryptography. Where appropriate, NSA plans to use the elliptic curves over finite fields with large prime moduli (256, 384, and 521 bits) published by the National Institute of Standards and Technology (NIST).

More specifically, the NIST Digital Security Standard (DSS) specifies algorithms for applications requiring a digital signature (published as Federal Information Processing Standards ("FIPS") Publication 186-4). Additionally, the hash functions to be used in the signature generation process are specified in the Secure Hash Standard (SHS), FIPS 180-4. Draft IETF "BGPSEC BGP Algorithms, Key Formats, & Signature Formats" (which is an update to RFC 6485, pending approval) specifies: i) the digital signature algorithm and parameters; ii) the hash algorithm and parameters; iii) the public and private key formats; and iv) the signature format which are used by RPKI Certification Authorities (CA) and BGPSEC speakers (i.e., edge routers). As this document summarizes this information, "The hashing algorithm used when generating certification requests and BGPSEC Update messages MUST be SHA-256 . . . . The signature algorithm used in certification requests and BGPSEC Update messages MUST be Elliptic Curve Digital Signature Algorithm (ECDSA)."

As described in NIST FIPS-186-4, in principle, a digital signature is an electronic analogue of a written signature, which can be used to provide assurance that the claimed signatory signed the information. The recipient of a signed message can use a digital signature as evidence in demonstrating to a third party that the claimed signatory in fact generated the signature (non-repudiation). A digital signature algorithm could be used to provide: data origin authentication (the assurance that the source of data is as claimed), data integrity (the assurance that data has not been altered), and non-repudiation (the assurance that an entity cannot deny previous actions or commitments).

A digital signature algorithm includes a signature generation process and a signature verification process. A signatory uses the generation process to generate a digital signature on data whereas a verifier uses the verification process to verify the authenticity of the signature. Each signatory has a public and private key and is the owner of that key pair. The key pair owner is the only entity that is authorized to use the private key to generate digital signatures. In order to prevent other entities from claiming to be the key pair owner and using the private key to generate fraudulent signatures, the private key must remain secret. The approved digital signature algorithms are designed so that the signatures cannot be forged. Ideally, a digital signature process should be existentially un-forgeable under chosen-message attack.

The public key is used in the signature verification process. While it is not required to keep the public key secret its integrity should be maintained. Any entity should be able to verify a correctly signed message using the public key.

Cryptographic hash functions are used with digital signature algorithms and keyed hash message authentications. In general terms, an n-bit cryptographic hash is defined as a primitive that generates n-bit hash values from arbitrary length messages, and must be one-way and collision resistant. In this context, one-way means that given a hash value, it will require about $2^n$ hash computations in order to identify a message that hashes to the same value. Collision resistance stipulates that identifying any two different messages that hash to the same value would require about $2^{n/2}$ hash computations. SHA-256 is a 256-bit one-way hash algorithm, which by definition provides 128 bits of security against collision attacks. When a message less than $2^{64}$ bits in length is input to SHA-256, the result is a message digest of size of 256 bits. Per FIPS 180-4, SHA-256 is deemed to be a secure hash algorithm. SHA-256 algorithm uses six logical functions each of which operate on 32 bit words, in a serial fashion that does not natively lend itself to parallelization, but scale with processor speed.

The Elliptic Curve Digital Signature Algorithm (ECDSA) is the elliptic curve analogue of the Digital Signature Algorithm (DSA). DSA was proposed by NIST in August 1991 for use in their Digital Signature Standard (DSS), and was adopted as FIPS 186 in 1993. Due to the fact that no subexponential-time algorithm is known for the elliptic curve discrete logarithm problem, it possesses a greater strength per key than DSA. Also, ECDSA signatures are substantially smaller than DSA signatures, and can be computationally faster. Specifically an ECDSA digital signature (r, s) is generated as specified below, using:
 1. Domain parameters that are generated in accordance with FIPS 186-4 Section 6.1.1,
 2. A private key that is generated as specified in FIPS 186-4 Section 6.2.1,
 3. A per-message secret number that is generated as specified in FIPS 186-4 Section 6.3,
 4. An approved hash function (such as SHA-256),
 5. An approved random bit generator.

NIST recommended curves for ECDSA are provided in Appendix D of FIPS 186-4. Three types of curves are provided:
 1. Curves over prime fields, which are identified as P-xxx,
 2. Curves over Binary fields, which are identified as B-xxx, and
 3. Koblitz curves, which are identified as K-xxx, where xxx indicates the bit length of the field size.

ECDSA and in general, public key signature algorithm operations, such as signature generation and verification, are compute intensive sequential operations, which require non-trivial amounts of compute cycles. Additionally, the operations must be performed so that they are Side-Channel Attack resilient, while vigilantly maintaining security of the private keys and per message random numbers. Although substantial research has shown yielded improvement of the serial performance of these operations with mathematical simplifications, pre-computations and other techniques, satisfying the convergence requirements over the considerable number of existing unique paths with two different concurrent public key signature algorithms is not feasible with simple serial compute optimizations or conventional task parallelization, even with the latest generation processors.

An ECDSA digital signature is verified using the same domain parameters and hash function that were used during signature generation, effectively by re-computing the signature. Due to the nature of the mathematical operations required for a proper ECDSA verification, its compute requirement is substantially higher than signature generation.

The BGPSEC standard stipulates up to two concurrent signature algorithms that can be used to sign path updates. One of these algorithms is defined as the ECDSA using SHA-256, and Curve P-256. The second algorithm is to be determined. Effectively, a BGPSEC router supporting both algorithms has to create two sets of unique signatures, which substantially increases the compute time required for signature generation. Furthermore, a path is deemed to be "valid" if either one of the signature sets is valid, potentially necessitating the computation of two signature validation algorithms for each path segment. Given that a path is on average composed of four segments (each with different signatures and private/public keys), typical path update verifications may require up to eight signature verification operations. Considering that presently there exist over 500,000 unique paths, several millions of concurrent cryptographic operations must be performed in a short time period to satisfy convergence requirements.

The BGPSEC protocol intends to create a secure environment with ROA and path verification, where once an edge router is authenticated, it is assumed to be acting within its design parameters. However, if one or more authentic edge routers are compromised, or their credentials are used to make rogue devices appear to be authentic, potential adversaries could devise and use attacks similar to Distributed Denial of Service to easily render other authentic edge routers ineffective by overwhelming them with repeated requests of path validation requests.

Furthermore, commercial edge routers have traditionally used relatively low compute CPUs and a small main memory footprint, in order to fulfill strict design requirements such as cost effectiveness, reliability and low power usage.

It would be desirable to address these issues.

SUMMARY

Multiple requests for signing paths and multiple requests for verifying paths are received by a networking device, and fulfilled at line speed. The networking device continuously and simultaneously receives multiple sign and verify requests per given period of time (for example, thousands, tens of thousands or a million per second). Typically, the networking device does not have a priori knowledge of the quantity, type, sequence, length, input data or frequency of the received requests. In order to continuously and simultaneously fulfill the received sign and verify requests at network line speed, the networking device performs signature operations and verification operations according to a rule based configuration. In some embodiments, the rule based configuration is in the form of one or more collection(s) of rules, defining types, characteristics, priorities and divisions for signature operations, for verification operations, and/or for subtasks of signature and verification operations, according to one or more network protocol(s). Performing signature and verification operations according to the rule based configuration can include breaking each one of the received sign and verify requests into multiple tasks, and placing the multiple tasks originating from the various received requests into a task pool with specific per task priorities, according to the rule based configuration. The tasks in the task pool are disassociated from the requests from which they originated, and from other tasks.

Each one of a plurality of execution agents comprises a separate general purpose compute unit in the networking device. Each execution agent has its own memory space and system resources. In one embodiment, each execution agent comprises a process or thread bound to a separate compute core in the networking device. Each execution agent repeatedly and simultaneously processes next available tasks from the task pool based on priority. Upon completion of a task, an execution agent places the corresponding status and output data into a completed task repository, and checks the task pool for the next available task based on priority. The results in the completed task repository are processed to fulfil the multiple received requests.

Describing operations performed by the execution agents in more detail, each execution agent contains one or more asynchronous worker routine configured for pre-generating values to be used in higher level calculations performed during task processing. For example, an asynchronous worker routine embodied in an execution agent can autonomously perform pre-calculations that result in pre-computed data to be used as inputs by higher-level functions during periods of time when no tasks are available in the task pool. Each asynchronous worker routine can store pre-generated values in one or more opaque objects in the memory space of its execution agent, for example in a non-volatile memory unit such that the pre-generated values are persistently retained. Some specific examples of pre-calculations that can be performed and stored by asynchronous worker routines are pre-generating random numbers, re-coding the random numbers, evaluating their modular inverses, calculating representations of base points, performing point multiplication operations using pre-generated re-codings of random numbers and pre-generated base points, and pre-generating values used to generate public keys.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the proceeding discussion that other embodiments of the structures and methods illustrated herein may be employed without departing from the described principles.

DETAILED DESCRIPTION

Figure 1:
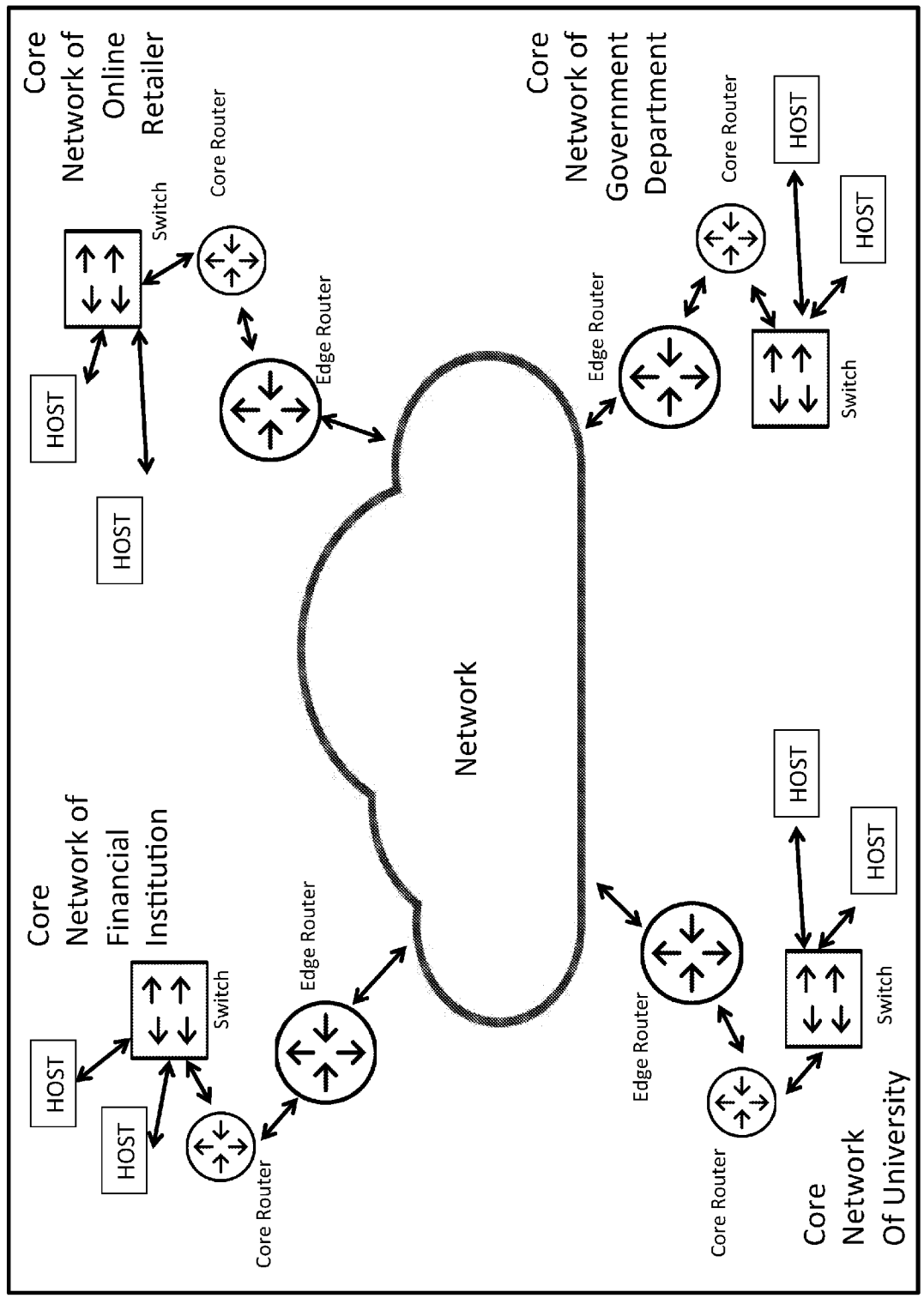
FIG. 1 is a block diagram of an exemplary network architecture in which a secure signature and verification operations parallelizing manager can operate, according to some embodiments.

FIG. 1 illustrates a high level overview of a network architecture in which a secure signature and verification operations parallelizing manager 101 can operate. The network architecture illustrated in FIG. 1 comprises multiple core networks, wherein an edge router is positioned at the edge of each core network, such that communication can be routed between core networks by the edge routers. A secure signature and verification operations parallelizing manager 101 may be present on each edge router. A core router is positioned within each core network, and routes traffic between hosts therein. It is to be understood that in practice many more computing and networking devices would typically be deployed in such a configuration.

Figure 2:
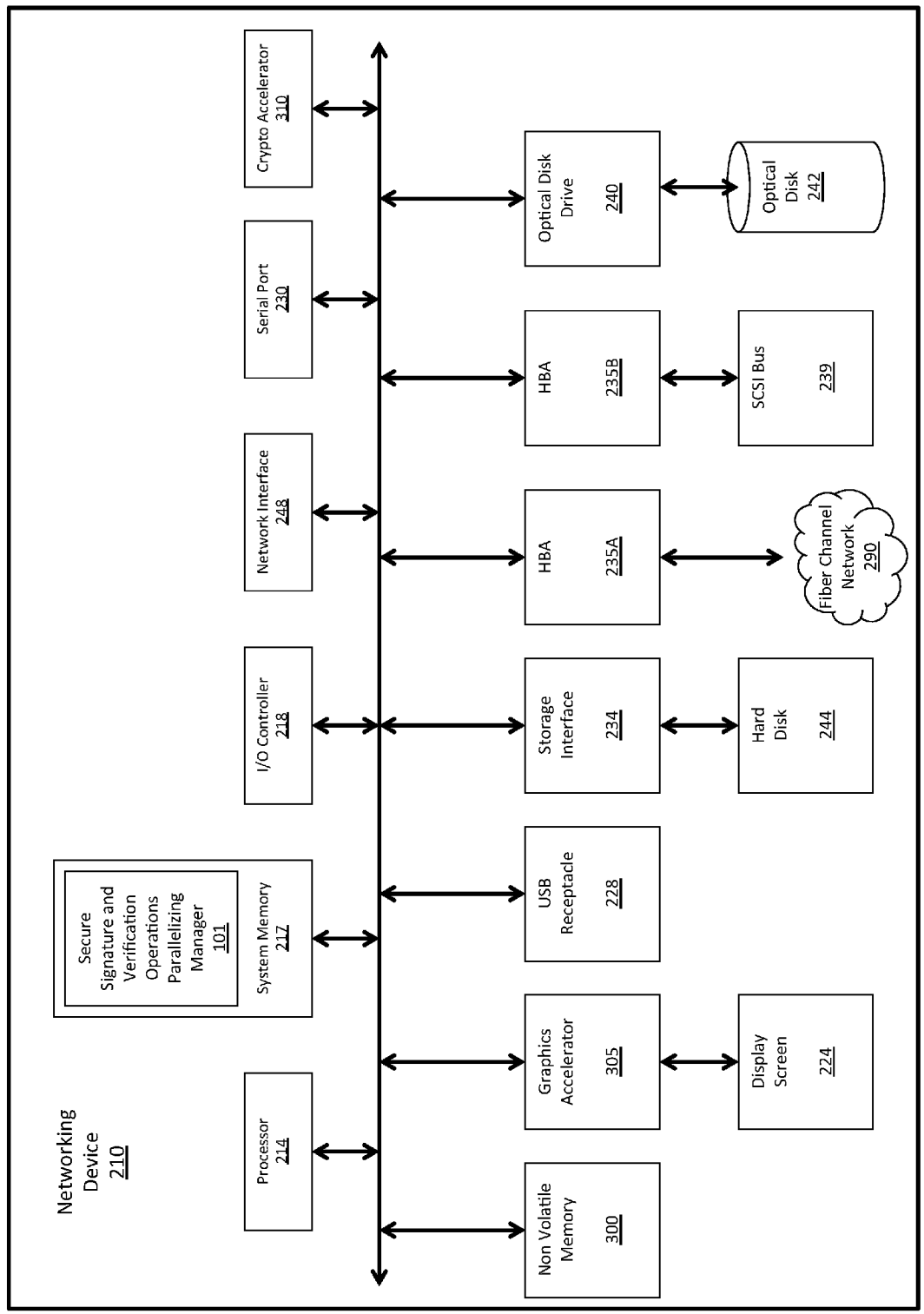
FIG. 2 is a block diagram of a networking device suitable for implementing a secure signature and verification operations parallelizing manager, according to some embodiments.

FIG. 2 is a block diagram of a networking device 210 (such as an edge router or core router), according to some embodiments. In general, a router is a computing device configured for specific functions, and can have components such as a bus 212, which communicatively couples other components, such as at least one processor 214, system memory 217 (e.g., random access memory (RAM), read only memory (ROM), flash memory), non-volatile memory 300, optical and/or magnetic storage, a network interface 248, multiple ports and interfaces, etc. Other conventional computing device components may be connected in a similar manner, and conversely all of the components illustrated in FIG. 2 need not be present. The components can be interconnected in different ways from that shown in FIG. 2.

The bus 212 allows data communication between the processor 204 and system memory 217, which, as noted above may include ROM and/or flash memory as well as RAM. The RAM is typically the main memory into which programs are loaded. The ROM and/or flash memory can contain, among other code, firmware which controls certain basic hardware operations. Programs can be stored on a local computer readable medium (e.g., hard disk 244, optical disk 242, flash memory, ROM) and loaded into system memory 217 and executed by the processor 214. Programs can also be loaded into system memory 217 from a remote location (i.e., a remotely located computer system), for example via the network interface 248. The network interface 248 can be directly or indirectly communicatively coupled to a network such as the Internet. Such coupling can be wired or wireless.

In FIG. 2, a secure signature and verification operations parallelizing manager 101 is illustrated as residing in the system memory 217 of the networking device 210. The functionalities of the secure signature and verification operations parallelizing manager 101, which are described in detail below, can reside on the networking device 210 as illustrated in FIG. 2, or be distributed between multiple computing devices as desired. It is to be understood that although the secure signature and verification operations parallelizing manager 101 is illustrated in FIG. 2 as a single entity, the illustrated secure signature and verification operations parallelizing manager 101 represents a collection of functionalities, which can be instantiated as a single or multiple modules as desired. It is to be understood that the modules of the secure signature and verification operations parallelizing manager 101 can be instantiated (for example as object code or executable images) within the system memory 217 (e.g., RAM, ROM, flash memory) of any computing device. As used herein, the terms "computing device," "computer system" and "computer" mean one or more computers configured and/or programmed to execute the described functionality. Additionally, program code to implement the functionalities of the secure signature and verification operations parallelizing manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

The secure signature and verification operations parallelizing manager 101 can execute a high performance Side Channel Attack resilient method to process simultaneous digital signing and verification of messages with one or more concurrent ECDSA or other public key digital signature algorithms at network line-speed, when the quantity, order or the type of requests may not be known a priori. In other words, the secure signature and verification operations parallelizing manager 101 can perform these functionalities without knowing ahead of time the type, order or number of incoming requests. In some embodiments, the secure signature and verification operations parallelizing manager 101 performs this functionality specifically in the context of Intrusion Detection and Prevention facilities. In one embodiment, the specific use case is the context of BGPSEC. The BGPSEC compliant solution described herein can be based on enterprise/carrier based hardware that addresses cryptographic performance requirements, while maintaining system reliability, integrity and power consumption envelope at an acceptable cost.

Each networking device 210 (e.g., edge router) is assigned a private key to sign messages. The private key can be used to sign multiple messages over its designed validity period. Each private key has a unique associated public key, which the receiving networking devices 210 use to verify the message signatures. Given that there are over close to 50,000 networking devices 210 worldwide, while, at a minimum, each AS only securely stores a single private key per signature algorithm at a time, in order to be able to verify messages each networking device 210 stores at least over 50,000 public keys per algorithm supported.

Figure 3:
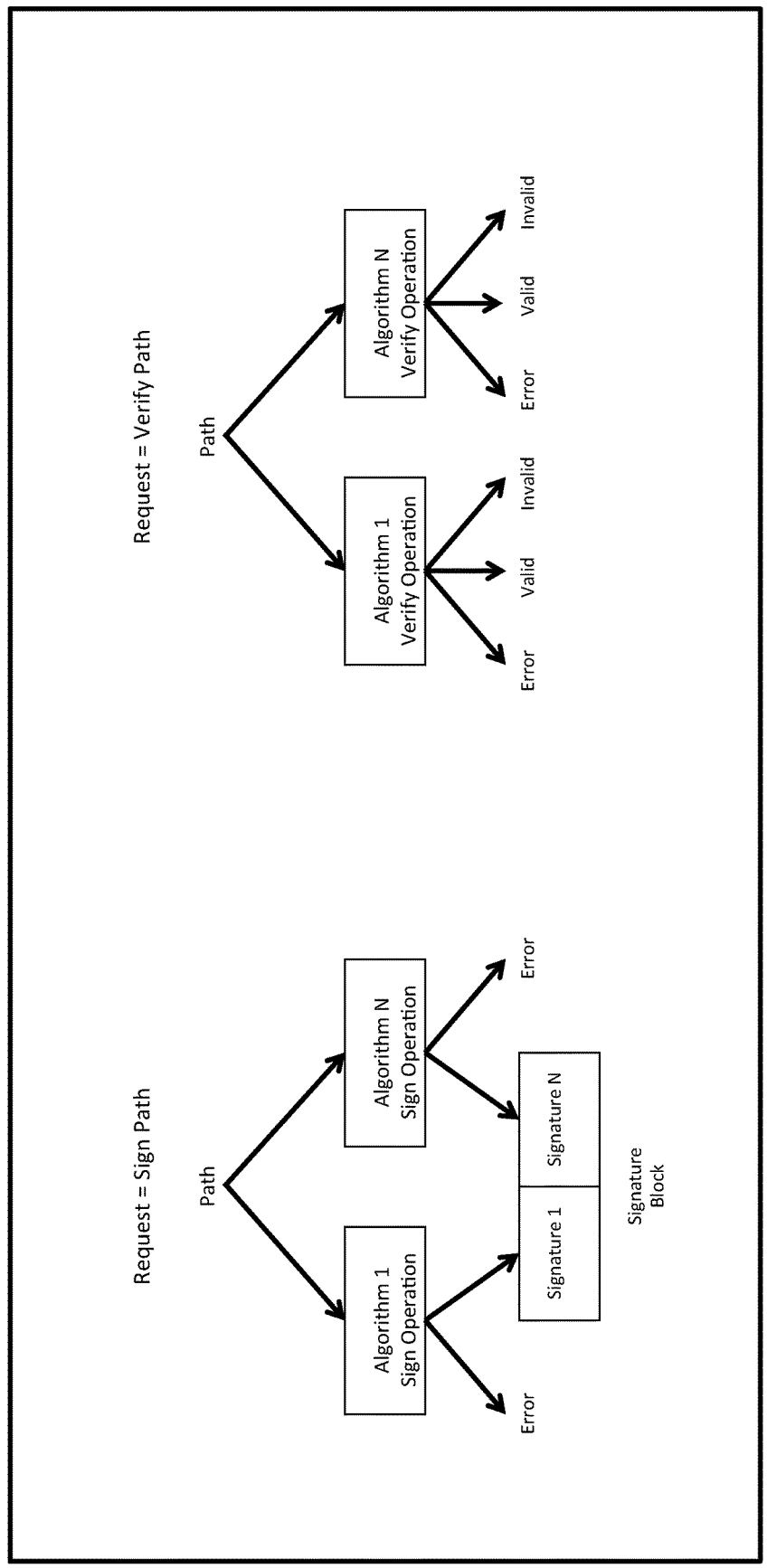
FIG. 3 is a diagram of cryptographic operations that can be performed by a networking device to support a secure network protocol to continuously sign and verify paths, according to some embodiments.

The cryptographic operations that would, in principle, be performed by a networking device 210 to support BGPSEC or some other secure network protocol using ECDSA or any other public key signature algorithm to continuously sign and verify messages (i.e., paths) are show in FIG. 3.

Figure 4:
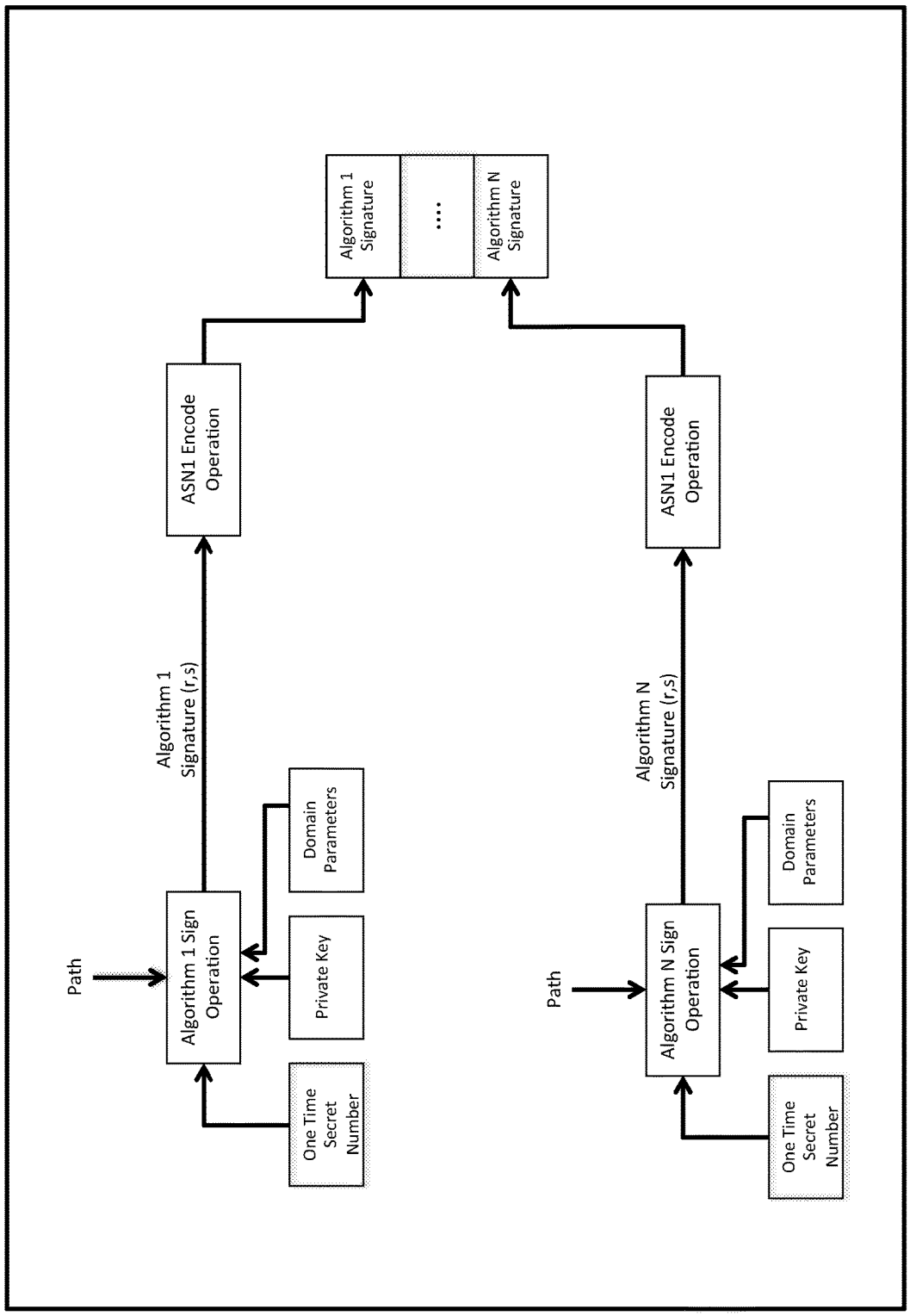
FIG. 4 is a diagram illustrating a version of a path sign operation, according to some embodiments.

FIG. 4 shows a detailed version of the Path Sign Operation. It should be noted that the One Time Secret Number can only be used to generate a single signature, so each ECDSA signature algorithm has to use a fresh One Time Secret Number with required security strength which is different for each algorithm. Additionally, each algorithm requires its own unique private key and associated domain parameters. The output is a proper ECDSA signature in the form of two integers r and s, which, in turn, is input to an encode unit to generate an ASN1 encoded signature to be inserted into the Signature Block for the Path. If a networking device 210 supports a single ECDSA algorithm, it generates a single ASN1 encoded signature with that algorithm and places it in the appropriate signature block segment. If the networking device 210 supports multiple algorithms, then it generates all the associated signatures and places them in the associated Signature Block segments.

Figure 5:
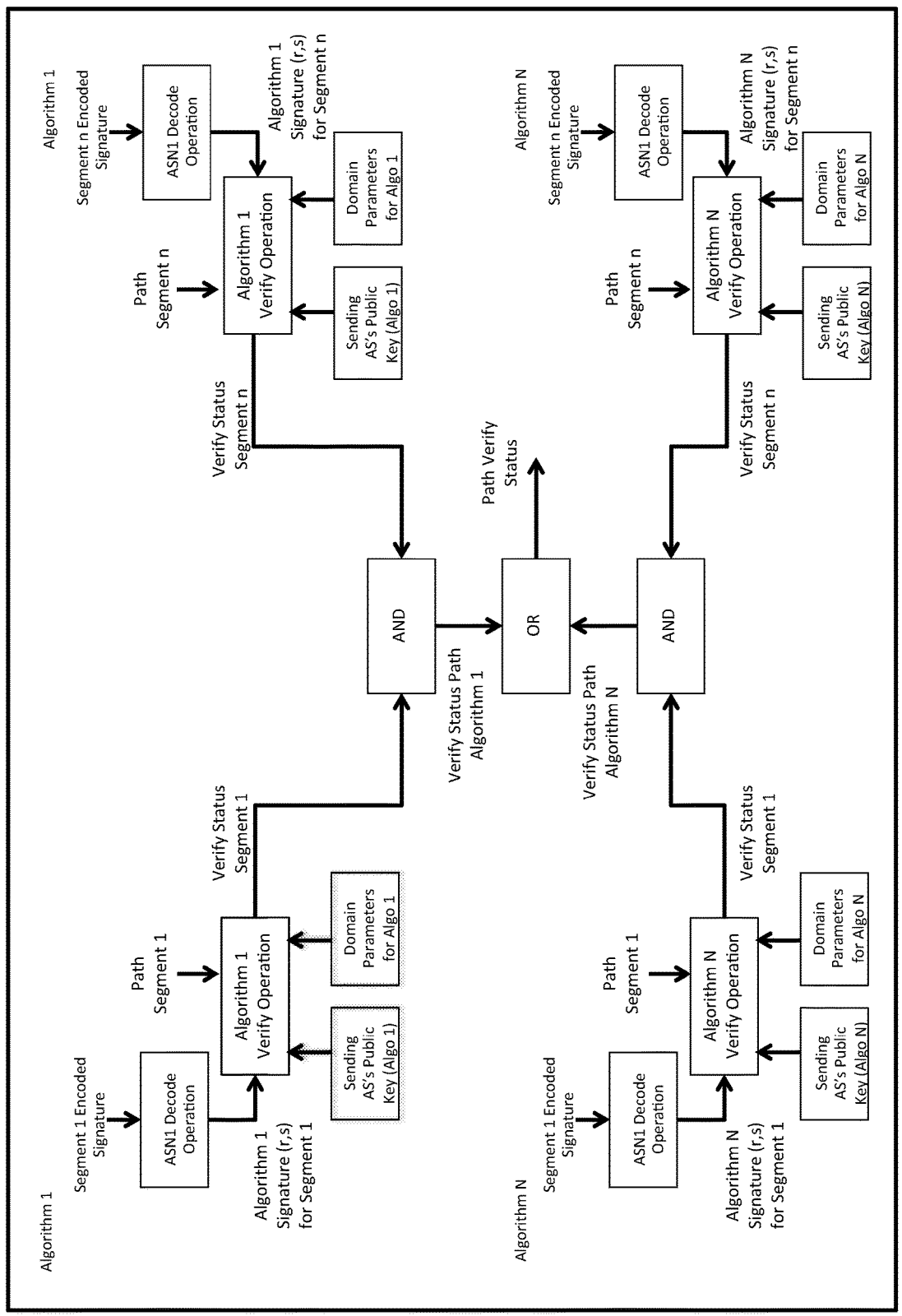
FIG. 5 is a diagram illustrating a version of a path verify operation, according to some embodiments.

FIG. 5 depicts the Path Verify operation. Note that the number of path segments contained in a path may not be known a priori. The Verify operation must be able to handle paths with zero segments to potentially over thousand segments effectively. Each path segment will potentially have a unique signature and public key, thus each path segment is be verified with the appropriate parameters. Additionally, if the networking device 210 supports multiple ECDSA algorithms, then path verification needs to be attempted with each algorithm. If the path is verified under any of the algorithms, then it is Valid, otherwise Invalid.

For each segment, the input signature (to be verified) is decoded from ASN1 provided format, and along with the public key, the domain parameters and the message (path segment) are processed accordingly. Effectively, the signature has to be re-computed using the public key, the domain parameters and the message, and then compared to the provided signature. If a match is found then the status Valid is returned for the segment.

It is to be understood that although the secure signature and verification operations parallelizing manager 101 is described herein utilizing example curves P-256, P-384 and P-521, the methodology described herein is applicable to other curves. While these curves are used as examples, the technique is applicable to any Prime or similar curve already defined or to be defined.

For proper implementation of ECDSA the use of a specific set of elliptic curve domain parameters are used for digital signature generation and verification. These domain parameters may be used for extended time periods (i.e. over multiple sessions).

Specifically the applicable ECDSA Domain Parameters are:

q, the size of the underlying field,
FR, a field representation indicator (NULL for Suite B curves),
a, elliptic curve parameter, (equal to q−3 for Suite B curves),
b, elliptic curve parameter,
G=(xG, yG), a point on the curve, known as the base point,
n, the order of the base point G, and
h, the order of the elliptic curve group divided by the order n of G; (h=1 for Suite B curves)

The equation of the curve is generally given as $$y^2 = x^3 + ax + b \bmod q.$$

For the Suite B curves, a=q−3, and with this value of a, the equation is equivalent to the one given in FIPS186-4, namely $$y^2 = x^3 - 3x + b \bmod q.$$

ECDSA digital signature (r, s) Generation is now described.

Input: A message M, which is the bit string to be signed; the elliptic curve domain parameters; the identity of the hash function selected by the signatory, as determined by the elliptic curve domain parameters; and the elliptic curve private key d employed by the signatory Output: The pair of integers (r, s), each in the interval [1, n−1].

Process:
1. Generate (k, k−1), a per message secret number and its inverse modulo n. [use the routine "ECC Per-Message Secret Number Generation Using Extra Random Bits," to generate k]. k−1 [inverse(k,m)] denotes a function that computes the inverse of a positive integer k with respect to multiplication modulo the number m.
2. Compute the elliptic curve point R=kG=(xR, yR) using EC scalar multiplication, where G is the base point in the set of domain parameters.
3. Compute r=xR mod n.
4. Use the selected hash function to compute H=Hash(M).
5. Convert the bit string H to an integer e by using
6. e=ΣH(i=1) 2H−i*bi, where b1, b2, . . . , bH, is the bit string to be converted
7. Compute s=(k−1*(e+d*r)) mod n.
8. Return (r, s).

ECDSA digital signature (r, s) Verification is now described.

Input: M': the received message, which is a bit string; (r', s'): the received signature on M', which is a pair of integers; the EC domain parameters used by the signatory; the identity of the hash function selected by the signatory, as determined by the EC domain parameters; and Q: the EC public key chosen by the signatory.

Output: An indication as to whether the purported signature is valid or not—either VALID or INVALID.

Process:
1. If r' and s' are not both integers in the interval [1, n−1], output INVALID.
2. Use the selected hash function to compute H'=Hash (M').
3. Convert the bit string H' to an integer e' by using:
4. e'=ΣH' (i=1) 2H'−i*bi, where b1, b2, . . . , bH', is the bit string to be converted
5. Compute w=(s')−1 mod n, using the Inverse Routine
6. Compute u1=(e'*w) mod n, and compute u2=(r'*w) mod n.
7. Compute the elliptic curve point R=(xR, yR)=u1G+ u2Q, using EC scalar multiplication and EC addition. If R is equal to the point at infinity O, output INVALID.
8. Compute v=xR mod n.
9. Compare v and r'. If v=r', output VALID; otherwise, output INVALID.

Note that domain parameters, k and d for P-256 are 32-bytes (256 bits) long each where as the points on the curve such as G and Q (public key) consist of 256 bit x- and 256 bit y-values each. The total length of the signature generated is 64 bytes (r 32 bytes, s 32 bytes). For the P-384 the domain parameters, k and d are 48-bytes (384 bits) long each where as the points such as G and Q (public key) consist of 384 bit x- and 384 bit y-values each. The total length of the signature generated is 96 bytes (r 48 bytes, s 48 bytes). Given that the registers of most contemporary CPUs (and other compute engines such as hardware accelerators) are either 32 or 64 bits, ECC arithmetic operations can be performed by using multi-precision arithmetic, which utilizes significant compute cycles for basic mp-integer operations (i.e. field operations) such as multiply, invert, and mod.

Elliptic Curve Point Representation and Basic Operations are now described. Assume E to be an elliptic curve over a prime field Fp with the affine equation y2=x3−3x+b. Defining two points on the curve as P1=(x1, y1) and P2=(x2, y2) with P1≠−P2, then $P3 = P1 + P2 = (x3, y3)$ is:

$x3 = \lambda 2 - x1 - x2$, and $y3 = \lambda(x1 - x3) - y1$, and $\Delta = (y2 - y1)/(x2 - x1)$ when $P1 \neq P2$, and $\lambda = (3x12 - 3)/(2y1)$ when $P1 = P2$.

Since general addition only works when P1≠P2, addition when P1=P2 is referred to as point doubling. Prime field inversions are considerably more expensive in compute resource requirements than field multiplication. Thus representing points using projective coordinates may be beneficial. Using Jacobian projective coordinates, it can be shown that the projective point (X:Y:Z), where Z≠0, corresponds to the affine point $(X/Z^2, Y/Z^3)$, and the point at infinity (i.e. the identity element) when Z=0.

Formulas for addition in mixed Jacobian-affine coordinates is given as:

$(X_3:Y_3:Z_3) = (X_1:Y_1:Z_1) + (X_2:Y_2:1)$, where $A = X_2 \cdot Z_1^2$, $B = Y_2 \cdot Z_1^3$, $C = A - X_1$, $D = B - Y_1$,
$X_3 = D^2 - (C^3 + 2X_1 \cdot C^2)$, $Y_3 = D \cdot (X_1 \cdot C^2 - X_3) - Y_1 \cdot C^3$,
$Z_3 = Z_1 \cdot C$ Where all the operations are performed using field arithmetic with multi-precision positive integers, formulas for doubling in Jacobian coordinates is given as:

$(X_3:Y_3:Z_3) = 2(X_1:Y_1:Z_1)$, where $A = 4X_1 \cdot Y_1^2$, $B = 8Y_1^4$, $C = 3(X_1 - Z_1^2) \cdot (X_1 + Z_1^2)$,
$D = -2A + C^2$,
$X_3 = D$, $Y_3 = C \cdot (A - D) - B$, $Z_3 = 2Y_1 \cdot Z_1$ As previously discussed, the ECDSA Sign Operation requires the multiplication of the curve base point G (Gx, Gy) with a scalar k which is also referred as the One Time Secret Number (OTSN). For example, for curve P-256, k is a 256 bit Deterministic Random Number with a security strength of at least 128 bits. The scalar multiplication is quite compute intensive and dominates the execution time of elliptic curve cryptographic operations. Considerable effort has been spent on minimizing the scalar multiplication time, however assuming all computations are actually carried out the expected running time of Algorithm 1 is approximately m/2 point additions and m point doublings (denoted 0.5 mA+mD), where m is the length of the binary number k (expected number of ones in binary k is about m/2). For P-256 this equates to 0.5(256)A+256D=128A+256D which is a considerable amount of compute time.

INPUT: $k = (k_{t-1}, \ldots, k_1, k_0)_2$, $P \in E(F_q)$.
OUTPUT: kP.
 1. $Q \leftarrow \infty$.
 2. For i from 0 to t−1 do
  2.1 If $k_i = 1$ then $Q \leftarrow Q + P$.
  2.2 $P \leftarrow 2P$.
 3. Return(Q).

Algorithm 1) Right to Left Binary Method for Point Multiplication is now discussed. Side-channel attacks on implementations of cryptosystems may include timing or power consumption measurements in order to reveal secret information such as the One Time Secret Number or the private key. In elliptic curve cryptosystems, implementations of point multiplication algorithms are the primary targets for side-channel attacks. Straightforward implementations of elliptic curve point multiplications, such as Algorithm 1, are exceptionally vulnerable to simple side channel attacks since they employ both point addition and point doubling.

Given the fact that point adding and doubling require substantially different algorithms, the bits of the OTSN could be extracted in a power consumption trace if the double-and-add algorithm is used for point multiplication. Differential Power Analysis (DPA) is an attack that enables extraction of a secret key stored in a cryptographic system where an adversary monitors the power consumption of the cryptographic system and then statistically analyzes the collected power signal data in order to extract the secret key.

Data randomizing is a DPA countermeasure, by which the intermediate data may be randomly transformed inside the cryptographic system. The technique mitigates leakage that can be exploited by a DPA since the intermediate data is no longer predictable. Additionally, Liardet and Smart, and Joye and Quisquater, have proposed reducing information leakage by using special representations of points.

There are several widely followed approaches to reducing the running time of the multiplication algorithm. One is alternative representations of k to reduce the number of one-bits (and hence reduce number of point additions) such as NAF along with pre-computation of point doublings (if the point is known). Advance algorithms may employ variations of these techniques for further performance gains. While alternative representations of k may introduce a performance benefit, the re-coding that is often needed may be susceptible to Side Channel Attacks because an adversary could use DPA to reveal portions of the secret information. In the case of pre-computation for ECDSA sign operation of prime curves, the point used in the multiplication phase is always the base point G, which is a known value and can be pre-calculated. Thus, to reduce the latency of the point multiplication Algorithm 2 can be used, which effectively uses a fixed-base NAF windowing method.

INPUT: Window width w, positive integer k, $P \in E(F_q)$.
OUTPUT: kP.
 1. Pre-computation: Compute $P_i = 2^{wi} P$, $0 \leq i \leq \lceil((t+1)/w)\rceil$
 2. Compute $NAF(k) = \sum_{i=0}^{l-1} k_i 2^i$
 3. $d \leftarrow \lceil(l/w)\rceil$
 4. $(k_{l-1}, \ldots, k_1, k_0) = K_{d-1} \| \ldots \| K_1 \| K_0$ where each $K_i$ is a $\{0, \pm 1\}$-string of length w.
 5. If w is even then $I \leftarrow (2^{w+1} - 2)/3$; else $I \leftarrow (2^{w+1} - 1)/3$.
 6. Evaluation: $A \leftarrow \infty$, $B \leftarrow \infty$.
 7. For j from I down to 1 do
  7.1 For each i for which $K_i = j$ do: $B \leftarrow B + P_i$
  7.2 For each i for which $K_i = -j$ do: $B \leftarrow B - P_i$
  7.3 $A \leftarrow A + B$.
 8. Return(A).

Algorithm 2) Fixed-base NAF Windowing Method for Point Multiplication is now discussed. The running time of this algorithm is approximately $(2w + 1/3 + d - 2)A$, which effectively eliminates all the doubling during the evaluation phase. Taking P-256 curve as an example and using a window size w=4, where d=ceiling(m/w)=64, the running time of the scalar multiplication is reduced to about 73 A. However, this algorithm requires the pre-computation of 64

EC Points at a storage requirement of 4 Kbytes (64 bytes*64). Algorithm 2 provides decent performance and its implementation is natively SCA resistant since it no longer uses point doubles, and employs only point additions.

In some embodiments it is possible to do further trade-offs with storage required for the pre-computed points versus improved function performance. Taking $(K_{d-1}, \ldots, K_1, K_0)_2^w$ as the base $2^w$ representation of k, where $d=\lceil (m/w) \rceil$, then $kP=\Sigma^{d-1}_{(i=0)} K_i(2^{wi} P)$. For each i from 0 to d−1, we then pre-calculate j number of points (where $j=(2^{w+1}-2)/3$ if w is even; and $j=(2^{w+1}-1)/3$ if w is odd) and store the pre-calculated Affine coordinate points (X, Y) in a two dimensional table, such as PTable[i][j]. The negative of the Y coordinate can also be stored in the table or computed on the fly depending on available storage. Thus, we can substantially simplify Algorithm 2 as shown in Algorithm 3.
INPUT: NAF(k), d, pT (Pointer to pre-computed data table)
OUTPUT: A=kP.
 1. Evaluation: A←∞.
 2. For i from 0 to d−1 do
   2.1 SafeSelect (Pi), use Ki=j to choose the appropriate P[i][j] from PTable.
   2.2 A←A+Pi
 3. Return(A).

Algorithm 3) SCA Resistant Fast Fixed-base NAF Windowing Method for Point Multiplication is now discussed. This algorithm has a the running time of (d)A, approximately 64 Point Additions for the Curve P-256, which results in a substantial reduction in latency, but requires over 50 Kbytes of storage. SafeSelect is an implementation specific function that can be used to select the appropriate table entry without leaking information about the secret scalar, where necessary.

Commodity computing unit frequencies, especially the models that are used in continuous operation critical infrastructure devices, such as edge routers, are relatively low in order to minimize power consumption and heat generation. These lower frequencies adversely affect the throughput and the observed latency of sequential algorithms. On the other hand, these computing units usually contain several compute cores, effectively acting as multiple independent compute units. On these platforms, where possible, such as High Performance Computing use-cases, computer scientists and engineers have conventionally broken complicated independent operations into separate tasks and run them in parallel to reduce operation latencies. When compute intensive underlying algorithms lend themselves to parallelization, this may be a beneficial process. Typically, best results are obtained when several long, independent processes can be run in parallel on their respective compute core, such that the cost of parallelization overhead can be amortized.

However, a careful examination of the Sign and Verify algorithms shows sequential dependencies. With Sign, the multiplication to calculate the r component of the signature depends on the generation of the random number, and the calculation of the s component of the signature depends on the r value and the Hash of the message, e. There may be a small gain parallelizing the multiplication with the hash generation, but for small messages (i.e. network paths), due to OS parallelization overhead any gains are minimal. For Verify, one may consider parallel execution of the two point multiplies, and then performing a point add, but there are optimal algorithms that can calculate the multi-scalar multiplication uG+vQ within a single routine using only point add instructions. Thus simple, conventional task parallelization techniques may not be well suited in this case.

In the context of network operations, such as BGPSEC, the order, type, sequence, length, and input data of the cryptographic calculations to be performed are not always known a priori. Thus, algorithmic functions are conventionally executed after the operation type and all the parameters have been received. Therefore, performance characteristics are usually measured as the observed latency of the execution of an operation, such as Signing or Verifying a path, as the time taken to generate a result after all the required parameters are supplied. As such, consideration is given instead to how the overall system resources could be used to reduce the latency of the network operations, asynchronously if needed, in order to maximize the networking device 210 compute resource utilization.

In a typical BGPSEC use case, the networking device 210 is performing a substantial number of simultaneous sign and verify operations especially during convergence periods, (potentially with more than one ECDSA and/or other public key signature algorithm), where the type and quantity of operations may not be known a priori and the available compute resources at any given instant is finite. Minimizing the latency of the individual sign and/or verify operations via specific mathematical optimizations and increasing system resiliency against Side-Channel-Attacks are important, but not sufficient to deliver adequate in-line system performance to sustain real-time network operations.

By contrast, the secure signature and verification operations parallelizing manager 101 maximizes the overall system performance which may involve millions of concurrent path sign and path verify operations in order to meet BGPSEC convergence requirements, while protecting the networking device 210 against Side-Channel-Attacks without degrading performance.

Figure 6:
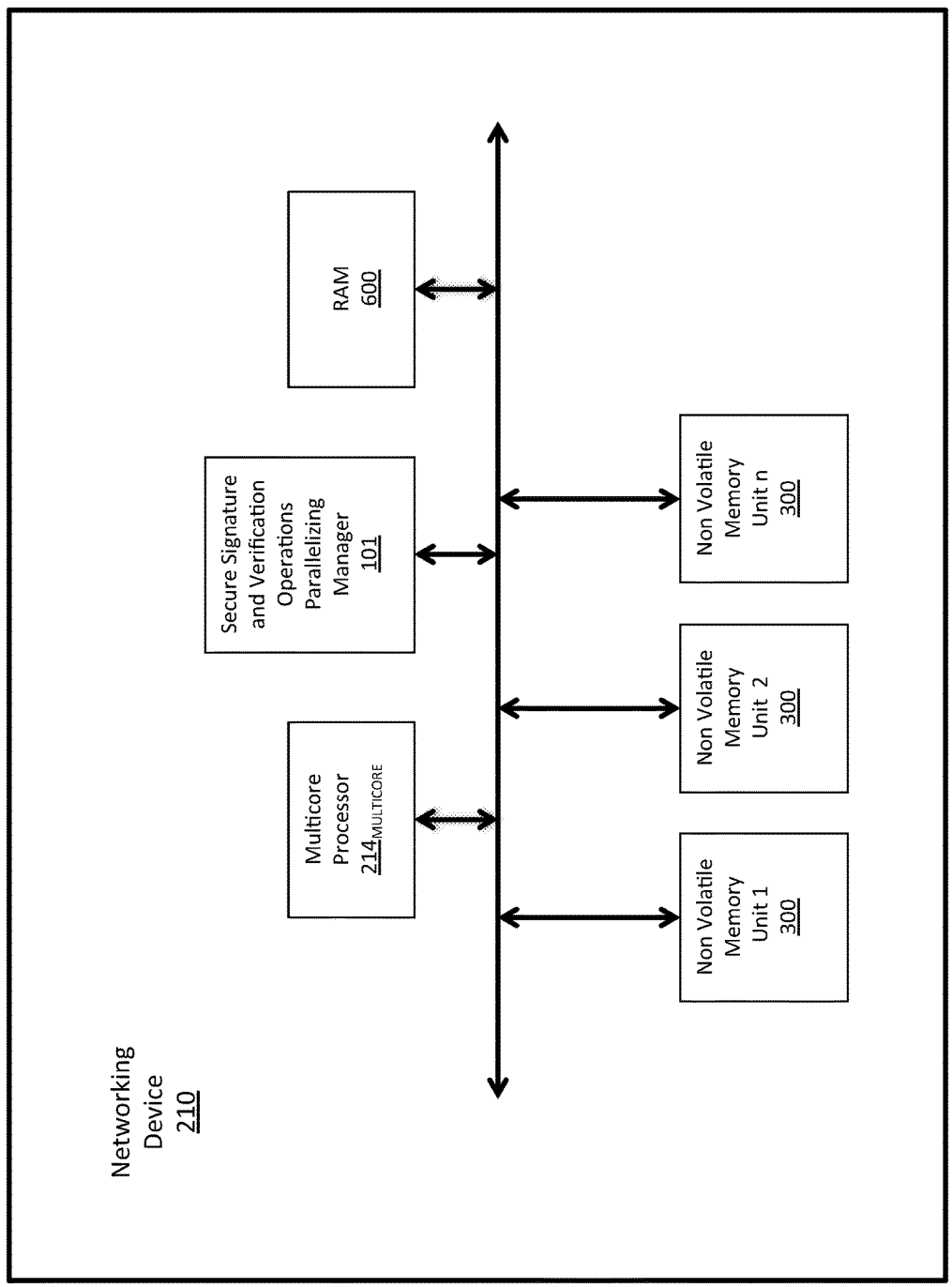
FIG. 6 is a block diagram of the secure signature and verification operations parallelizing manager and corresponding components used in its operation, according to some embodiments.

FIG. 6 shows a block diagram of the secure signature and verification operations parallelizing manager 101 and corresponding components used in its operation, according to some embodiments. It is to be understood that these components can be instantiated in the form of or in conjunction with a networking device 210 (as illustrated), a network appliance, a standalone computer system, an add-in card using a standard or non-standard interface, etc.

The networking device 210 compute resources are comprised of one or more types of compute devices (e.g., CPUs, crypto accelerator chips/cards, FPGA custom accelerator cards, graphics accelerator cards, etc.), on which worker routines 705 and procedures are executed as described in detail below. FIG. 6 illustrates a multicore processor $214_{MULTICORE}$ as an example, but it is to be understood that in other embodiments other instantiations are possible (e.g., multiple ones of one or more type of processor 214). Random Access Memory (RAM) 600 stores any input values required to perform the immediate operations, and stores the results to be used by the client programs. However, the RAM 600 is traditionally not large enough (due to system cost and heat dissipation) to store all the values required to maintain the system functionality and performance. Additionally, the data kept in the RAM 600 is not persistent; when the system loses power or is re-booted its contents are lost. Thus in some embodiments a custom programmed fast Non-Volatile Memory Unit (NVMU) 300 or multiple NVMUs 300 are used for system reliability and performance enhancements. The NVMUs 300 can be based on a number of technologies and use a number of different interfaces such as PCI-3, or may be in the form of nvDRAM and accessed similar to traditional DRAM. As described in more detail below, the NVMU 300 can be configured as several secure partitions or objects, which may be protected via a deterministic mechanism such as authenticated data encryption or a combination of deterministic mechanisms. Objects in the NVMU 300 are opaque, and depending on the object type, access is restricted to only those functions that are approved to either read or write that object. This not only increases data security via controlling data access, but it also enables uniform and consistent time access to objects. External functions (client programs) do not have any direct access to low-level system resources such as the NVMU 300 or the data management functions.

Figure 7:
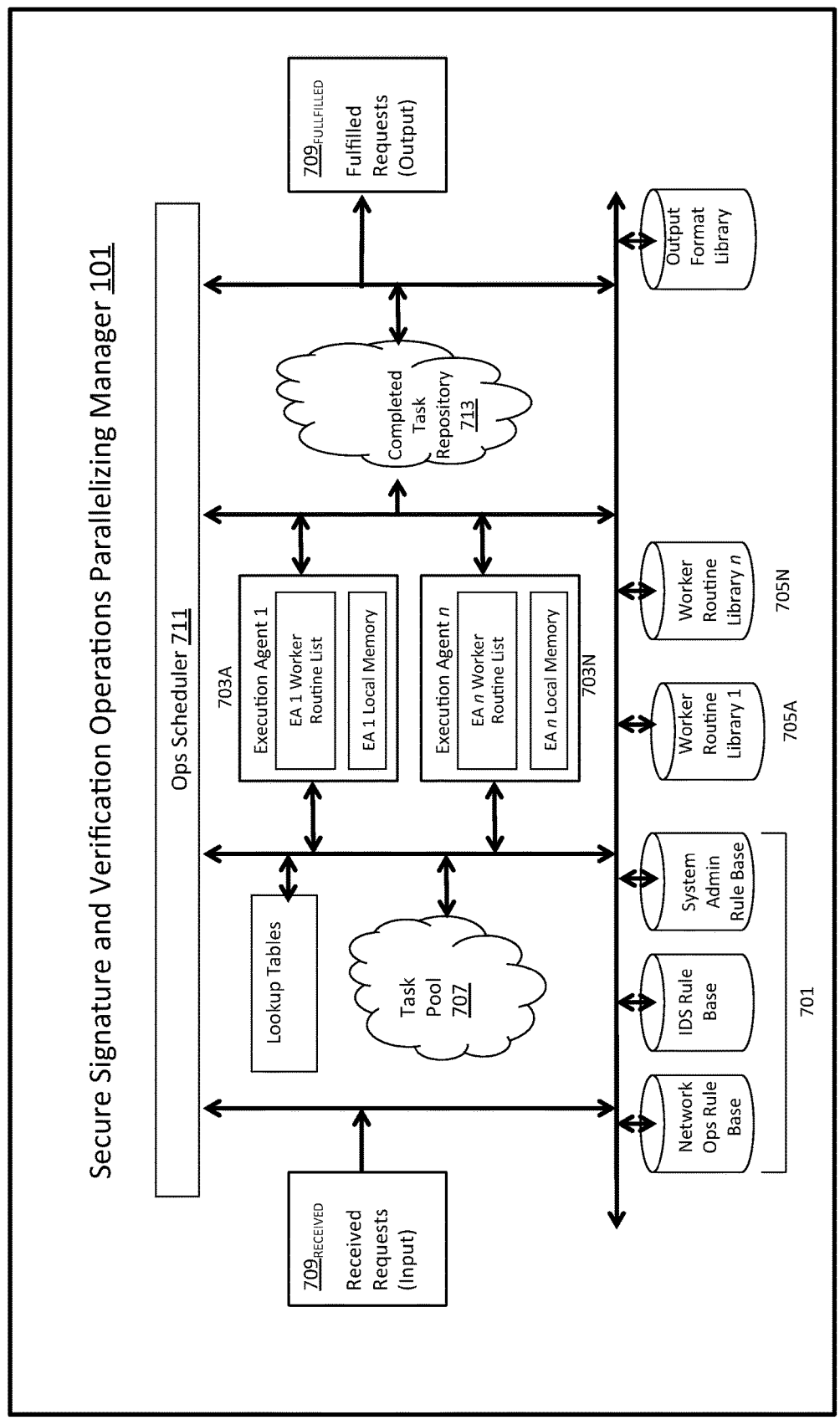
FIG. 7 is a block diagram of the operation of the secure signature and verification operations parallelizing manager and multiple execution agents, according to some embodiments.

Turning now to FIG. 7, at a macro-level, the secure signature and verification operations parallelizing manager 101 is responsible for managing and causing the execution of the network protocol requests 709 in a secure and optimized fashion. Therefore, it manages a rule-based configuration 701, with collections of rules specifying procedures to ascertain the optimal methods to serve the network protocol requests 709 while maintaining data integrity, confidentiality, and availability. Furthermore, it creates and dispatches adjustable "Execution Agents 703," which contain asynchronous and duty-specific "worker" routines 705, specifically optimized to available compute resources, and creates one or more "Task Pool(s) 707" as staging areas for tasks to be fetched by the Execution Agents 703. In one embodiment, the secure signature and verification operations parallelizing manager 101 binds itself to a specific computing unit core and then creates and dispatches Execution Agents 703 as threads or processes, and binds each to the remaining compute cores. In other words, each execution agent 703 can be bound to or otherwise instantiated as a separate core or processing unit, and can be thought of as an independent compute unit. FIG. 7 shows a block diagram of the operation of the secure signature and verification operations parallelizing manager 101 and multiple execution agents 703, according to one embodiment. Note that although only two execution agents 703 are illustrated in the example of FIG. 7, a secure signature and verification operations parallelizing manager 101 can contain more as desired.

Upon receiving a network protocol request 709 (e.g., a request 709 to sign or verify a path), the secure signature and verification operations parallelizing manager 101 validates the request parameters, applies Intrusion Detection functionality as applicable, and places the multiple tasks to be performed to fulfill the request 709 into a task pool 707, with appropriate priorities. The secure signature and verification operations parallelizing manager 101 does not have to wait for the execution to complete, and can places tasks into the task pool 701 based on back-to-back requests 709. When an Execution Agent 703 completes a task, it places the status and any output data (e.g., signature of a path) into a "Completed Task Repository 713," and continues with the next task. The secure signature and verification operations parallelizing manager 101 is responsible for processing the results in the completed task repository 713, and fulfilling the original network protocol requests 709.

It is to be understood that the secure signature and verification operations parallelizing manager 101 can be continuously and simultaneously receiving large numbers (e.g., thousands, tens of thousands, one million, etc.) of requests 709 per given time period (e.g., per second) to sign and verify paths (in some embodiments with two or more algorithms). The requests 709 need to be fulfilled simultaneously in order for the networking device 210 (e.g., the edge router) to operate at line speed. As noted above, the secure signature and verification operations parallelizing manager 101 may not know in advance the quantity, order or the type of the requests 709. The secure signature and verification operations parallelizing manager 101 breaks individual requests 709 in multiple tasks, and places them in a task pool 707, where tasks are disassociated from their requests 709 and from the other tasks required to fulfill their requests 709. Tasks in the pool 707 are assigned to or otherwise associated with available execution agents 703. In some embodiments, every execution agent 703 is configured to be able to process any task (i.e., individual execution agents 703 are general purpose, as opposed to being designated for specific operations).

The secure signature and verification operations parallelizing manager 101 performs its operations based on a customizable rule based configuration 701. This rule based configuration 701, which can comprise multiple rule sets as illustrated in FIG. 7, provides flexibility, scalability and adaptability to future protocol changes. Certain rules can establish types, characteristics, priorities and divisions for network cryptographic operations (e.g., signature and verify operations), and for various ones of their subtasks, according to one or more network protocols. For example, when a path verification request 709 for multiple segments (hops) is received, the secure signature and verification operations parallelizing manager 101 could parse that request 709 into individual segment verifications using a certain curve, and place the individual verifications in the task pool 707, in order to exercise multiple Execution Agents 703 to maximize system throughput. Other rules could define the processes to use for periodic key rollover and emergency key rollover operations. It is to be understood that these are just examples, and in different embodiments rules can direct the secure signature and verification operations parallelizing manager 101 to parse requests 709 into tasks and schedule and prioritize tasks, etc., according to the specifics of the protocol and request 709. In this context, FIG. 7 illustrates an ops scheduler 711 as a component of the secure signature and verification operations parallelizing manager 101. Additionally, configurable Intrusion Detection System ("IDS") rules can be used to apply intrusion detection functionality to received requests 709, and thereby provide a flexible mechanism to harden the networking device 210 against known and future attacks. In one embodiment, the secure signature and verification operations parallelizing manager 101 uses a reasoning system with forward and backward chaining inference engines.

As noted above, each Execution Agent 703 can perform any task. Execution Agents 703 are configured to embody a finite list of duty specific worker routines 705 and associated priorities based on the network protocol features. In the case of BGPSEC, these worker routines 705 could be defined as signing and verifying a path with ECDSA P-256, or with another signature algorithm. Furthermore, Execution Agents 703 may also contain asynchronous worker routines 705 for lower level functions such as random number generation, public key integrity check and pre-calculations. Since the worker routines 705 are specialized to execute specific functionality they can be optimized to a much greater extent than generic functions. Depending on the overall protocol requirements and system capabilities, the Execution Agents 703 can be populated at initialization or system run-time with an identical list of worker routines 705, or contain different sets of optimized worker routines 705.

An Execution Agent 703 can be thought of an independent compute unit, and as described above each Execution Agent 703 can be bound to its own core. For system security and enhanced performance, each Execution Agent 703 maintains its own memory space and system resources.

While the secure signature and verification operations parallelizing manager 101 can dynamically request/provide updates to Execution Agent's worker-routines and associated priorities, it does not have any access to the Execution Agent's local working memory and resources in order to ensure full data abstraction.

Any available Execution Agent 703 can take and execute the next priority task in the Task Pool 707, ensuring system resource maximization as long as network tasks are available. However, due to the sporadic nature of network operations, there could be periods, which could be only a few milliseconds to several seconds at a time, when no tasks are available in the Task Pool 707. The asynchronous worker routines 705 embodied in the Execution Agents 703 autonomously use these periods to perform certain pre-calculations, which generate pre-computed data to be used as inputs by higher-level functions in order to maximize the overall system throughput.

Figure 8:
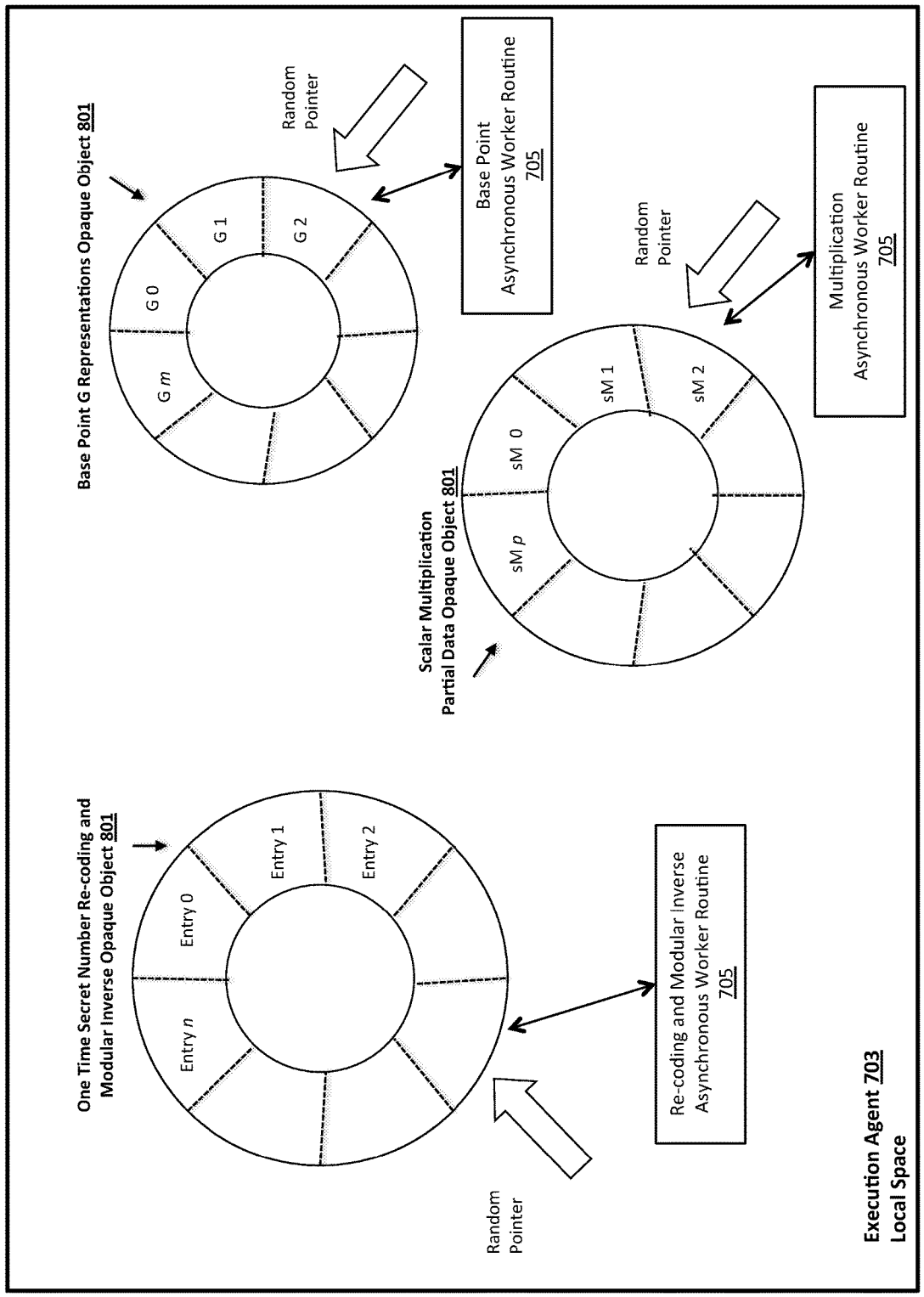
FIG. 8 is a diagram of asynchronous worker routines and opaque objects, according to some embodiments.

Turning now to FIG. 8, an example of reducing the latency of the Sign operation via the use of the asynchronous worker routines 705 is described. The process of generating an approved secure random number, recoding it, and evaluating its modular inverse for ECDSA calculations is a computationally expensive procedure. In order to substantially reduce the latency of a sign operation, asynchronous worker routines 705 can pre-generate approved random numbers, recode them and evaluate their modular inverses and store these values in an opaque object 801 asynchronously (opaque objects 801 are described in greater detail below). When a task (e.g., a task performing a section of a path sign operation) requires one or more of these values, it can retrieve pre-calculated values from an opaque objects 801, rather than waiting for the values to be generated. As described in greater detail below, opaque objects 801 are securely managed so that an adversary could not reveal the pre-computed values via Side-Channel analysis during the associated point multiplication evaluation phase.

An Execution Agent 703 (which as noted above can be bound to or instantiated in the form of a core or processing unit) defines a context where an asynchronous worker routine 705 can be run in its own local memory space without affecting or getting affected by other operations that may be running in parallel within the networking device 210. For example, as shown in FIG. 8, an asynchronous worker routine 705 can be defined to generate approved random numbers, recode them and evaluate their modular inverses asynchronously based on secure seed values, and store them in a protected segment of RAM 600 and/or NVMU 300, implemented as an opaque object 801, rather than a traditional FIFO (First In First Out) queue, or FILO (First In Last Out) stack, or a similar structure. The opaque objects 801 could be stored in contiguous memory, non-contiguous memory, or a combination depending on the implementation. Conceptually they can be represented as tables (e.g., multi-dimensional arrays), which directly store the data, or they can be constructed as lookup tables that maintain links to the actual data. In some embodiments, they can be constructed as linked lists of opaque structures, which either contain the data or pointers to the data. The linked lists can be implemented as flat lists or in a circular fashion (as illustrated in FIG. 8), where the tail pointer points to the head pointer. Neither the structure of the opaque objects 801 nor their addresses are visible to the other Execution Agents 703 or the higher level secure signature and verification operations parallelizing manager 101. An Execution Agent 703 may contain several identical or different opaque objects 801 to satisfy various protocol requirements. For example there may be a unique object for P-256 calculations and another one for P-521 since they use parameters of different sizes.

In one embodiment, at system initialization, the Execution Agent 703 dispatches an asynchronous worker routine 705 to build a dynamically allocated object to store the re-codings (e.g., NAF) of properly generated One Time Random Numbers and the respective modular inverses of these Random Numbers. The initial size of the opaque object 801 could be suggested by configuration parameters, however, asynchronous worker routines 705 can use information such as the number and type of network requests 709 received within a given time period, system memory 217 capacity, etc., to dynamically adjust the size of an opaque object 801 during run-time in order to ensure that higher level functions will not data starve (e.g., to ensure that there is enough storage capacity in the opaque object 801 for ample NAFs, modular inverses, etc., to supply the respective higher level operations). Typically, a minimum initial size of an opaque object 801 is such that the convergence requirements are met.

Each opaque object 801 is made up of elements of memory blocks of a certain byte size adequate to hold the intended information (e.g., NAFs, modular inverses, etc.). In a doubly linked list implementation, each element contains a pointer to the previous element and a pointer to the next element (elements in a singly linked list implementation contain a pointer only to the next element). In an array-based implementation, elements are accessed via indices. The element data are defined without typecasts, and the actual object 801 elements do not all need to be in a contiguous memory block.

One type of duty-specific asynchronous worker routine 705 generates approved random numbers, re-codes them, computes the modular inverses of these random numbers, and stores them in the opaque object 801. Based on system configuration parameters (which can vary between protocols, scenarios, embodiments, etc.), the asynchronous worker routine 705 continues until a specified minimum number of elements are stored in the opaque object 801. After that, the asynchronous worker routine 705 opportunistically (i.e. when there are no other network tasks/no higher priority asynchronous worker routines 705 running in the Execution Agent 703) computes additional elements to further populate the opaque object 801 to its maximum capacity. Moreover, multiple asynchronous worker routines 705 may simultaneously perform similar or a different type of calculation within various other Execution Agents 703 without affecting other worker routines 705. If the opaque object 801 is an array, either the computed elements themselves or pointers to the computed elements' memory addresses are stored as array elements, using array indices. If the opaque object 801 is a linked list, then the structures holding the computed elements or their addresses are inserted into the linked list by updating the link list pointer(s). Consumption of elements from an opaque object 801, as explained in detail below, reduces the available elements in the object 801 (each element is used only once), thus regular replenishment during run-time is performed.

For further side channel attack protection, the content in the elements in the opaque object (e.g., re-codings and modular inverses) are consumed in a random fashion. Analogous to spinning a wheel to make a unique and random choice, a random number (e.g., random index) in the interval $[1, \text{OpOb}_{ActualSize}]$ (where $\text{OpOb}_{ActualSize}$ is the actual number of elements in the object 801) is generated to access a unique random element in the opaque object 801. The element in the opaque object 801 corresponding to the generated random number is thus randomly chosen. The randomly chosen element is consumed in the next stage of calculations, and is removed from the opaque object 801. If the opaque object 801 is a table, the random index is used as an array index and effectively provides the contents of the structure at that particular array position. The random element could contain the actual data or a pointer to the data in either contiguous or non-contiguous memory. If the opaque object 801 is a linked list, the random index, the structure size, and the address of the head element are used to calculate the address pointing to a random element in the linked list. As with a table implementation, the random element could contain the actual data or a pointer to the data in either contiguous or non-contiguous memory.

If the re-coding and modular inverse opaque object 801 is sufficiently populated and no higher-level network tasks are available for a particular Execution Agent 703, a multiplication asynchronous worker routine 705 could perform the point multiplication (k*G) by using the re-coding of the OTSN and a representation of the base point G. Since the computationally expensive point multiplication does not depend on the path to be signed, pre-computing this value is allowed. Effectively, the multiplication asynchronous worker routine 705 randomly fetches an element from the (e.g., circular) re-coding and modular inverse opaque object 801, as well as a random copy of a representation of the base point G, from a base point representation opaque object 801, which can be asynchronously populated by a separate base point asynchronous worker routine 705, as illustrated in FIG. 8. The multiplication asynchronous worker routine 705 can thus perform point multiplication operations and store the products in a multiplication opaque object 801. It is to be understood that with projective coordinates, there are multiple equivalent ways to represent a Point, including the base point, on the elliptic curve. The multiplication worker routine 705 may further store its partial or complete result in another protected opaque object 801. In one embodiment, the result generated by the multiplication worker routine 705, at the minimum, contains both the calculated x-coordinate of the elliptical point and the associated modular inverse of the OTSN, whose re-coding was used in the point multiplication operation. The coordinate representation and the format of the result is implementation dependent and thus varies between embodiments, but should typically be deterministic. Depending on the network workload, adjustments can be made dynamically to the size of the various opaque objects 801 collectively or independently, as well as to the relative priority of the various asynchronous worker routines 705, to ensure that adequate pre-calculation values are available in the opaque objects 801 to maintain the security and the high throughput of the system at line speed.

Therefore, when an Execution Agent 703 fetches from the Task Pool 707 a request 709 for an ECDSA sign operation, one of its asynchronous "sign" worker routines 705 can randomly (e.g., using the spinning wheel analogous operation) access the calculated x-coordinate, the associated modular inverse of the OTN used, and perform the rest of the calculations at the appropriate priority. Opaque objects 801 for the pre-computation values can be primed during system boot time, or refreshed (i.e., wiped and re-computed) as desired during system idle periods. Thus by effectively and securely disassociating the time required for the random number generation, recoding and scalar multiplication, the actual observed latency of the message sign operation can be drastically reduced, improving system resource utilization and overall throughput.

Since there is no data dependency between generating signatures with different ECDSA and/or other public key signature algorithms, or even with the same algorithm, requests 709 for these network operations may also be parallelized for further performance gains. In other words, the same path can be signed with two or more different supported algorithms in parallel. Thus there may be one or multiple Execution Agents 703 processing various network operation tasks independently of each other. Therefore, the secure signature and verification operations parallelizing manager 101 enables simultaneous generation of signatures with multiple ECDSA and/or other public key signature algorithms at network line-speeds, while minimizing its overall compute requirements, so that available compute resources can be applied to other simultaneous requests 709, such as Path Verify or public key management. Furthermore, Side-Channel-Attacks are effectively mitigated via multiple integrated methods. Adversaries cannot directly observe the full sign operation for timing or differential power analysis, since i) generation and re-coding tasks for OTSN are completely disassociated from any actual sign operation; ii) the representation of the projective coordinates used for base point G is completely disassociated from any actual sign operation; and iii) core point multiply routine uses a SCA resistant algorithm which includes only point additions.

As previously described, the latency of the verify operation is directly proportional to the time taken to perform two scalar multiplications, one with the Base Point and the second with the public key (which is represented as an EC Point). One implementation could use Algorithm 1 in sequence to calculate the multiplications and perform a point add to evaluate R(x)=uG+vQ, which will take approximately 2(0.5 mA+mD)+A. For P256, this would be 257 Point Adds and 512 Point Doubles, which requires considerable compute resources. The scalars used in the multiplication for verify are based on the signature generated by the signing party (i.e. another networking device 210 propagating a route) and are not known a priori. However, the base point and associated public keys per networking device 210 is known ahead of time. One potential optimization technique is where certain point doubles of the point G is pre-calculated, but the doubles of the public key is calculated during the actual evaluation period. Other optimization techniques include pre-computing a small number of doubles for both G and Q (the public key), but if not done optimally the storage and memory management can become a bottleneck to system performance. Via various pre-computation methods, a single path segment verify operation can be optimized up to a certain extend using techniques such as Shamir's trick or Solinas joint sparse form. For example, Shamir's trick will take about (((22w−1)/22w) d−1) A+(d−1)w D, effectively taking for P-256 (using a w=4) about 63 Point Adds and 504 Point Doubles, providing significant performance gains over the straightforward implementation with a few points stored. In applications where storage is available and can be managed well, pre-calculating and storing certain point doubles of both points G and Q can provide drastic performance gains. It is to be understood that these are examples, and in various embodiments asynchronous worker routines 705 embodied in execution agents 703 can asynchronously pre-generate different values used to generate public keys, and store the pre-generated values in opaque objects 801 for consumption during public key generation. As discussed in greater detail below, public keys themselves can also be pre-generated and stored in some embodiments.

Algorithm 4) Fixed-base NAF Windowing Method for Multi Scalar Point Multiplication is now discussed. The secure signature and verification operations parallelizing manager 101 can utilize a worker routine 705 for a multi-scalar point multiplication based solely on point add operations which effectively reduces the core calculation $R(x)=uG+vQ$ to about $((2w+\frac{1}{3}+d1-2)A+(2w+\frac{1}{3}+d2-2)A)$, which for P-256 using $w=4$ and $d1\approx d2\approx 64$ results in only about 144 EC Point Add operations. In embodiments where adequate storage is available, such as BGPSEC compliant devices, Algorithm can be extended for multi-scalar multiplication, shown as Algorithm 4, which will reduce the required number of Point Additions from 144 to only 128.
INPUT: Window width w, positive integer u and v, G and $Q \in E(Fq)$.
OUTPUT: $uG+vQ$.
1. Pre-computation: Compute $G_i=2^{wi} G$, $0 \leq i \leq ceil((t+1)/w)$
2. Compute $Q_i=2^{wi} Q$, $0 \leq i \leq ceil((t+1)/w)$
3. Compute $NAF(u)=\Sigma_{i=0}^{l_1-1} u_i 2^i$ and $NAF(v_2)=\Sigma_{i=0}^{l_1-1} v_i 2^i$
4. $d_1 \leftarrow ceil(l_1/w)$; $d_2 \leftarrow ceil(l_2/w)$
5. $(u_{l-1}, \ldots, u_1, u_0)=U_{d-1}\|\ldots\|U_1\|U_0$ where each $U_i$ is a $\{0, \pm 1\}$-string of length w
6. $(v_{l-1}, \ldots, v_1, v_0)=V_{d-1}\|\ldots\|V_1\|V_0$ where each $V_i$ is a $\{0, \pm 1\}$-string of length w
7. If w is even then $I \leftarrow (2^{w+1}-2)/3$; else $I \leftarrow (2^{w+1}-1)/3$.
8. Evaluation: $A \leftarrow \infty$, $B \leftarrow \infty$.
9. For j from I down to 1 do
   9.1 For each i for which $U_i=j$ do: $B \leftarrow B+G_i$
   9.2 For each i for which $U_i=-j$ do: $B \leftarrow B-G_i$
   9.3 For each i for which $V_i=j$ do: $B \leftarrow B+Q_i$
   9.4 For each i for which $V_i=-j$ do: $B \leftarrow B-Q_i$
   7.5 $A \leftarrow A+B$.
10. Return(A).

An average BGPSEC path is comprised of about four hops (segments), but can potentially be more than a thousand segments. Furthermore, in some embodiments, a networking device 210 may simultaneously use multiple different public key signature algorithms or curves. Thus to properly verify a path, each segment is simultaneously evaluated by potentially multiple public key signature algorithms. A loop or an equivalent construct can be used to evaluate each segment with the first algorithm, and if that fails, evaluate with the next algorithm. At best the path is evaluated with only the first algorithm (i.e., a valid path is found) and at worst all the path segments are evaluated n times, where n is the number of different signature algorithms (which may still result in an Invalid Path).

In one embodiment, in order to maximize the throughput, the secure signature and verification operations parallelizing manager 101 uses, along with other techniques, a task parallelization approach where worker routines 705 optimized for each public key algorithm are dispatched in parallel for each path segment at the same time, across multiple Execution Agents 703 running on multiple compute units via the Task Pool 707. If the evaluation for a segment under a public key signature algorithm fails at any point, the secure signature and verification operations parallelizing manager 101 invalidates the remaining path segment verification task requests 709 under that signature algorithm still in the Task Pool 707. Thus resource use is reduced by not evaluating remaining segments, which would not have changed the Invalid status of the overall segment. The verification operations parallelizing manager 101 dynamically adjusts Execution Agent 703 task priority based on resource availability to effectively reduce the latency of an L segment path from L*(SegVerifyOpLatency) to about 1*(SegVerifyOpLatency) and in cases with multiple public key signature algorithms the latency is reduced to be just slightly higher than the longest duration Seg Verify Op. (i.e., from L*(SegVerOpLatencyAlgo$_1$)+ . . . +L*(SegVerOpLatencyAlgo$_n$)) to, at the worst case, ~SegVerOpLatencyAlgo$_x$, where Algo$_x$ is the signature verification algorithm with the longest latency).

In some embodiments, the secure signature and verification operations parallelizing manager 101 contains rules to detect intentional or unintentional path verification requests 709 with path segments over a given threshold. At the time of receipt, it is unknown whether a verify request 709 with a number of segments over the threshold is actually malicious in nature or not (i.e., requests 709 to verify paths with many segments are not malicious per and are supported at a protocol level). However, sending verify requests 709 for paths with large numbers of segments could be used as a way to attack the networking device 210, by intentionally overwhelming its resources. Therefore, in some embodiments, to ensure continued system functionality, verify requests 709 for paths with a number of segments exceeding the threshold are assumed to be an intrusion attempt, and therefore handled accordingly. For example, a path verification request 709 for a path consisting of hundreds or even thousands of hops is valid from a protocol perspective, but could seriously hinder the performance and usability of the networking device 210. In one potential implementation, upon receiving a network request 709 to verify a very long path, based on configuration parameters, the secure signature and verification operations parallelizing manager 101 could place each of the path segment verification tasks belonging to the long path into the main Task Pool 707, albeit at a priority lower than other network tasks and key pre-calculation tasks. Thus these long path segment verifications would be done if and only if there are idle compute resources. In some embodiments, the secure signature and verification operations parallelizing manager 101 may instruct a single Execution Agent 703 to process all the segments of a path above the acceptable length threshold, thus ensuring the rest of the Execution Agents 703 are available for other incoming network tasks. Effectively, long paths above certain thresholds are seamlessly processed during system idle periods ensuring proper system operation and throughput. The specific value(s) to use for threshold(s) is/are variable design parameters, and be adjusted up and down as desired.

From an overall networking device 210 perspective, there still exists another potential major performance bottleneck, caused by the search, access, validation and integrity check of public keys out of the substantial number of public keys stored on the networking device 210. Public key management in this context is now discussed, according to some embodiments.

For most network protocols, the public keys stored on the networking device 210 are provided by a Certification Authority, and for network protocols such as BGPSEC, they are encoded in the ASN1 format. Once the public key corresponding to that of the original signing networking device 210 is located in the storage and read into system memory 217, it must be decoded, checked for syntactical correctness, and mathematically verified that it represents an actual point on the elliptic prime curve, before it can be used in the path segment verification calculations. Additionally, the integrity of the public keys must be protected and checked before each use for the duration that they are valid, which could be up to two years for BGPSEC. A potential attack on a networking device 210 could be the manipulation of the public keys, which will hinder the networking device's ability to verify paths. The use of a public key without the appropriate integrity checks will violate the security requirements of ECDSA and similar public key based algorithms.

Algorithmic representations of the public key search, access and validation steps for BGPSEC, as an example, are provided in Algorithm 5 and Algorithm 6.

---

INPUT: networking device Number: networking device n; SKI; Key Lookup Table: List of stored structures for networking device/SKI/Q
OUTPUT: Public Key: Q
  1. Search networking device n within the Key Lookup Table
  2. if a match is found then
    a. Search SKI within that networking device's List of SKIs
    b. if a match is found then
      i. Decode and Run Integrity check (i.e. recalculate SKI and check)
      ii. Validation check (i.e. ECC Partial Public-Key Validation)
      iii. If Integrity Check and Validation are successful
        1. Return success and Q
      iv. else return path error
    c. else return path error
  3. else return path error
Algorithm 5) Public-Key Access and Integrity and Validation Checks
INPUT: Candidate Public Key: $Q = (x_Q, y_Q)$; curve domain parameters
OUTPUT: Success or failure
  1. Verify that Q is not the point at infinity O.
  2. Verify that $x_Q$ and $y_Q$ are integers in the interval $[0, q - 1]$.
  3. Verify that $y_Q^2 \bmod q = x_Q^3 + a * x_Q + b) \bmod q$
  4. Return Success or Failure
Algorithm 6) ECC Partial Public-Key Validation

---

Assuming around 50,000 public keys per public key signature algorithm on a system, such as a BGPSEC capable networking device 210, attempting to perform all these operations in-line for each Verify process will introduce additional latency to the already costly path verify operations. Furthermore, if done sequential to the above calculations, pre-calculating a certain number of point doubles of the public keys to be used by the multi-scalar multiplication algorithm could also be a very time consuming process.

It would be desirable to address these issues.

The innovative public key management process provides a mechanism where the traditional Integrity Check, Validation Check, and pre-calculations are performed only once per public key during its validity period, rather than at each use. The pre-calculated public key data is stored using a Tiered Method with provisions for dynamically caching the most used public keys along with measures for graceful start from potential system re-boots. Furthermore, the process provides a collision resistant and fast access method to the pre-calculated public key data with more optimal integrity checks.

As described with Algorithm 4, the point multiplication operations for the segment verification operation can be substantially optimized using a pre-calculated table for each public key in lieu of the actual public key. An example process to pre-calculate the public keys is given below.

Take $(K_{d-1}, \ldots, K_1, K_0)_2^w$ as the base $2^w$ representation of k, where $d=\lceil(m/w)\rceil$, then
$kP = \Sigma_{(i=0)}^{d-1} K_i(2^{wi} P)$
For each i from 0 to d−1,
  pre-calculate j number of points, where
    $j=(2^{w+1}-2)/3$ if w is even;
    $j=(2^{w+1}-1)/3$ if w is odd
  Store in two-dimensional Table Furthermore, if the integrity of the pre-calculated public key tables could be maintained, they can be accessed directly during scalar multiplication, avoiding the traditional per verification public key integrity and validation checks. It is to be understood that in practice, pre-calculated tables can be stored in several formats including the binary format, as long as the format is deterministic. Since the public key is a known entity, there is no reason to maintain the table's confidentiality with a mechanism such as encryption. However, an efficient cryptographic method is needed to ensure the table's integrity. An networking device 210 could potentially store millions of pre-calculated public key tables, thus it is imperative to choose a high performance method. The SKI, which effectively is the SHA-1 of the public key data, has a very low latency but does not by itself offer adequate collision resistance to be used as an integrity checker for systems with a large number of entities. SHA-256, with a collision resistance of 128 bits, is a prudent choice to use to ensure the integrity of the public key pre-compute tables.

Therefore, in some embodiments, the secure signature and verification operations parallelizing manager 101, at system initialization or maintenance periods (i.e. full public-key update), enters into a mode where each original public key is decoded, checked for integrity and validated using Algorithm 6. If the checks pass, a corresponding pre-computed table is generated using a deterministic process. In some use cases, the pre-computed table could be appended with system specific metadata to facilitate further analysis and better indexing. For example, the metadata could include information such as the creation date and time, the version of the library that created it, and the coordinate format indicator of the pre-computed values, etc.

Once complete, the table's SHA-256 value is computed as an Integrity Indicator. Then the table is written to a file whose name includes a unique system identifier and the computed hash value (e.g. AS200101_IntegrityIndicator.q) and stored on the system drive. Using the hash within the file name ensures that no two unique pre-computed tables will end up with the same file name in the system. Furthermore, if an adversary was able to modify the binary pre-computed data, they will have to also calculate the new SHA-256 value and change the filename as well. Since the original SHA-256 Integrity Indicators are stored in the protected Key Lookup Tables, the system will correctly detect this and take proper counter-measures based on the rules in its IDS rule-base.

In order to provide fast access to pre-computed key data while maintaining resiliency, in some embodiments, the system may use a Tiered Storage and Caching Mechanism. In a typical computing system, the traditional DRAM provides the fastest access to data. However, the DRAM may be limited in size and may be volatile. Thus if a system is intentionally or unintentionally re-booted, all the pre-computation data stored in a volatile DRAM will be irrevocably lost, hindering system performance. On the other hand, while the amount of data that needs to be stored on a non-volatile disk array is not prohibitive, data access speeds could easily become a performance problem with 6 Gb/s to 9 Gb/s SAS or SATA hard-drives even with the new SSD technology, and indeed severely affect verify operation and system throughput.

Figure 9:
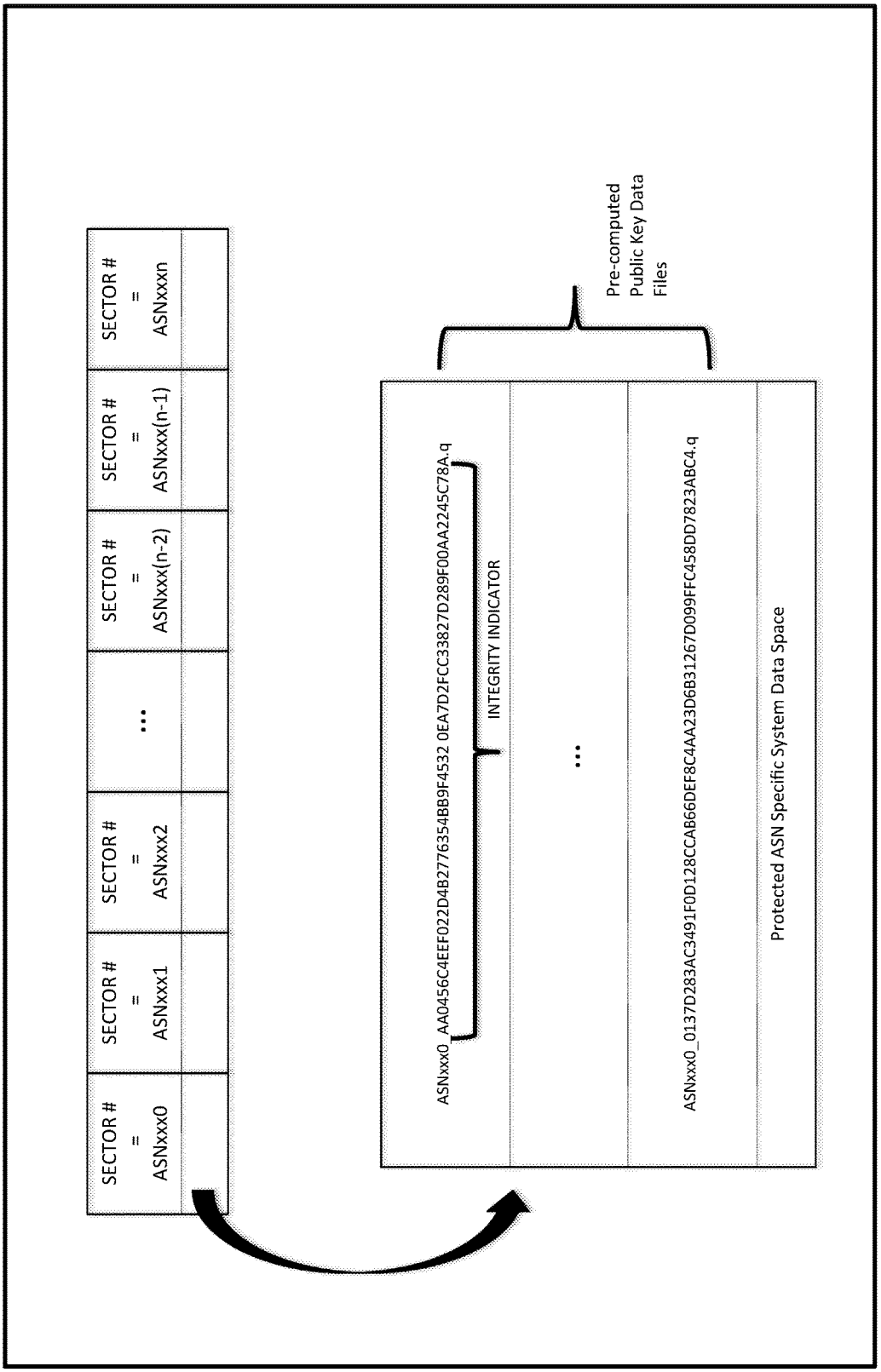
FIG. 9 is a block diagram of a Non-Volatile Memory Unit (NVMU) configuration, according to some embodiments.

The secure signature and verification operations parallelizing manager 101 utilizes a novel approach to appropriately store, access, and manage the pre-computed data. In order to minimize non-volatile storage access latency, a fast NVMU 300 (which may be based on PCI-3 or other interfaces with similar performance characteristics) is configured with multiple blocks that may hold all or some of the information regarding the pre-computed public key tables. As will be understood by those of ordinary skill in the relevant art in light of this document, the innovative public key processing and management process described here is applicable to any type of digital signature algorithm that uses public key cryptography. In one possible instantiation, the NVMU 300 could be configured to have a unique block or directory associated with each networking device 210 Number that will contain the entire pre-computed public key data associated with that networking device 210 along with any other system required information. This information may be stored in a number of different ways in order to better align with compute cache systems, improve access times, or ensure anti-tampering. The blocks could be opaque and only accessible by applicable routines. From a performance perspective, accessing each block is a constant time operation, since the NVMU 300 can be configured such that access to each block is linear time. The NVMU 300 used by the secure signature and verification operations parallelizing manager 101 in this embodiment possesses high performance data read and write rates compared to traditional spinning and SSD drives, and along with configuration methods described ensures that the system performance is maximized. FIG. 9 shows a possible instantiation of the NVMU 300 configuration.

The NVMU 300 provides a fast non-volatile mechanism to store the necessary pre-computed data. In some instances two or more NVMUs 300 can be used in a RAID mirror configuration for increased resiliency, or a secondary drive of any type could be used for real time replication of the main NVMU 300.

Figure 10:
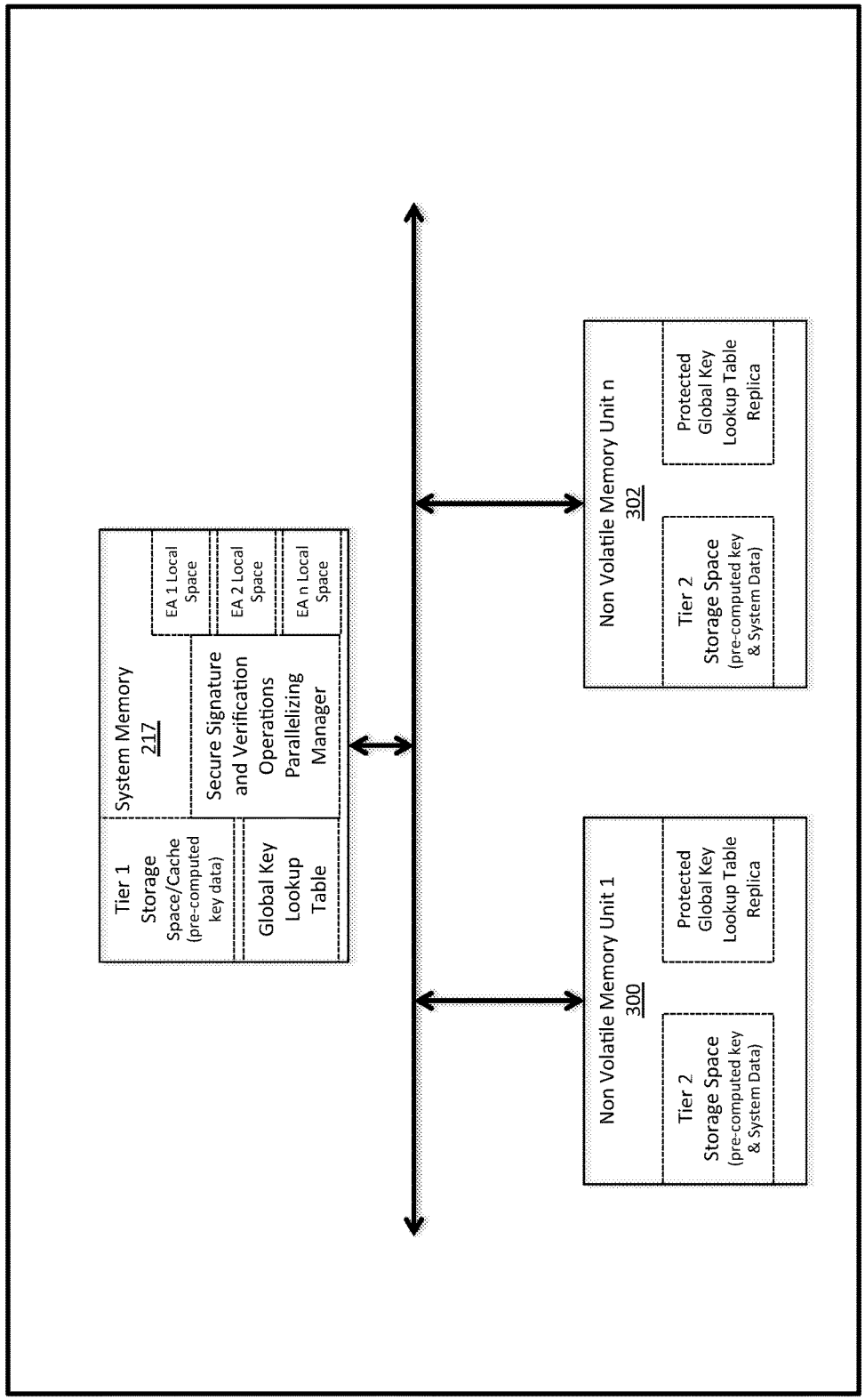
FIG. 10 is a diagram illustrating an embodiment in which a portion of system memory (DRAM) is used as Tier 1 memory and a non-volatile mechanism (e.g., NVMU 300) is configured as Tier 2, according to some embodiments.

In one embodiment, shown as FIG. 10, a portion of the system memory (DRAM) is used as Tier 1 memory and the non-volatile mechanism (e.g. NVMU 300) is configured as Tier 2. High capacity systems with enough DRAM to contain the entire pre-computed public key data along with memory space requirements for the system operations, could use the main system DRAM to store and access the entire pre-computed public key data. In this case, any data will be real-time replicated in the NVMU 300 primarily for resilience and backup. In systems where the DRAM is not large enough to contain the entire pre-computed public key data, the Tier 1 is treated as a Cache, where, for example, the most frequently used pre-computed public key data is kept. Depending on the system capabilities, the Cache may contain the pre-computed data for a few hundred or thousands of public keys.

To enhance access to the pre-computed key data, the secure signature and verification operations parallelizing manager 101 utilizes a dynamically created and managed opaque "Key Lookup Table." The Key Lookup Table contains entries for the entire set of the valid public key data available to the system. In some instances, such as BGPSEC, by providing the networking device 210 number, SKI and other appropriate information as indices via a "Key Lookup Function," an Execution Engine can obtain a pointer to a memory block which contains the pre-computed key table data. One or more Execution Agents 703, depending on whether they were configured with the appropriate Key Lookup Function, could access the Global Key Lookup Table. The Lookup Function incorporates the necessary logic to ensure that multiple Execution Agents 703 can safely access the opaque Key Lookup Table. Organizationally, the Lookup Table is made up of data blocks with unique addresses, one per networking device 210. In order to maximize the performance of the lookup operation each networking device 210 number is associated with an index, or the address of the corresponding Lookup Table data block, stored in an "ASN Number to Public Key Lookup Table Index Table." To increase system security, this index value may represent a virtual memory address, rather than the actual physical address, and may need to be further processed by the Lookup Function to reach the appropriate destination. Once the required data block is identified, SKI and other information are used to identify the address of the appropriate pre-computed data table, and the link to the data table is returned.

To maintain system resiliency and facilitate graceful restart from a re-boot, the Key Lookup Table is also stored on the VMNU as an exact replica. To ensure both its integrity and confidentiality the replica of the Lookup Table on the non-volatile drive(s) is encrypted with a suitable algorithm such as AES-256 GCM.

Figure 11:
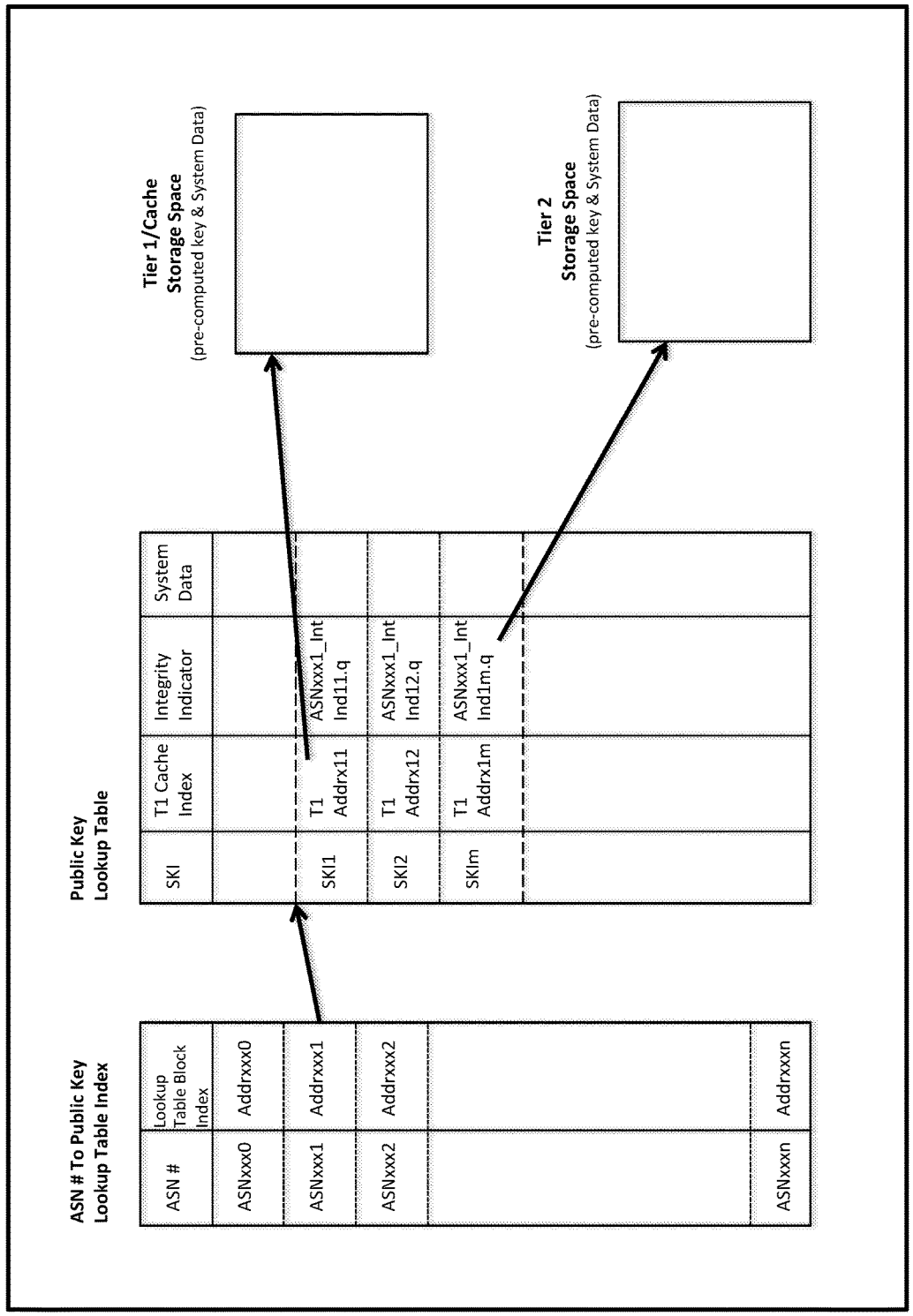
FIG. 11 is a diagram illustrating lookup tables used in public key operations, according to some embodiments.

In certain instances where the entire pre-computed public key data is kept in the Cache (i.e. system Memory), the accesses are extremely fast. In use cases where the system Memory Cache contains only a subset of the available public key data, further measures need to be taken to locate the data on cache misses as well as maintaining the cache. When the Cache is intended to contain only a subset of the pre-computed key data, the Lookup Table's other fields may need to be used to locate the appropriate data. For a networking device/SKI entry the pointer to the Tier 1 Address of the pre-computed key data may be NULL, if the associated pre-computed key data is not yet read to the Cache (i.e. System Memory). However, another field, called the Integrity Indicator in the entry contains the hash value of the pre-computed public key data. When the Key Lookup Function finds an entry for the ASN, SKI information, but the Cache pointer entry is NULL, it must locate the data on the storage and copy it into the system memory. Given that the pre-computed public key data filenames are constructed with the Integrity Indicator (i.e. the SHA-256 hash value), the Lookup Function constructs the appropriate filename, reads the file into a Tier 1 (Cache) slot, replacing another block of data if needed depending on the Cache Management algorithm used, and re-hashes the file's contents. If the evaluated hash matches the entry's Integrity Indicator, then the function returns the address of the memory block, which now contains the pre-computed data for the requested pubic key. A conceptual representation of the tables used in this operation is provided in FIG. 11.

The pre-computed public key data retrieval when the Cache does not contain all the available public key data can be time consuming. Thus systems should be configured with the appropriate amount of system memory depending on the intended use of the system. In instances, where the most frequently used networking device 210 (and corresponding public key information) is known or can be determined, configuration rules can be used to selectively pre-fill the Cache at system initialization. It is understood that when the Cache is large enough to contain the entire pre-computed public key data, it could always be pre-filled at system initialization.

Given that most public keys have a relatively long validity period, the one time process of integrity checks, validation, pre-calculation and storage can be done during system initialization and/or during system maintenance periods. However, any or all of the public-keys can be invalidated and/or updated at any given time. Invalidated public keys are immediately marked as such in the Tiered Storage system Lookup tables and certain asynchronous worker routines 705 reclaim the storage space occupied by the invalidated keys during system idle times.

Single or a few key updates during system run time can be seamlessly handled by the secure signature and verification operations parallelizing manager 101, which will enter these requests 709 in the Network Task Pool 707 with the appropriate priority based on configuration key management rules. If the network request 709 is identified as a public key update for a frequently used networking device 210, the task will be entered as a high priority full public key update request 709. The first available Execution Unit, configured with a "Lookup Table Update Function" and the appropriate permissions, will therefore fetch the request 709 and perform traditional decode, integrity and validation checks on the fresh public key, complete the pre-calculations, generate appropriate metadata and the integrity for the table and properly store the table file in one macro operation. Lower priority public key update requests 709 may be handled as a macro operation or as individual operations scheduled based on system idle times.

A full key update (i.e. the update of all or a large number of public keys on the networking device 210) during runtime is a major operation and could hinder the performance of the system. In one embodiment, the secure signature and verification operations parallelizing manager 101 re-configures a subset of Execution Agents 703 with the "Lookup Table Update Function." Then this subset of the Execution Agents 703 is instructed via the Task Pool 707 to process and pre-compute the updated public keys. Depending on the use case the secure signature and verification operations parallelizing manager 101 may prioritize checks and pre-computes for public keys belonging to certain networking devices 210. The rules for full key update are maintained in the rule-base and could be the same or different depending on the use case of the BGPSEC router.

The secure signature and verification operations parallelizing manager 101 defines multiple methods and modes to configure and populate the system and its storage Tiers with the necessary data. One mode could be labeled as the "Training and Self-Check Mode," in which the system is activated but does not actually propagate routes. At a minimum, it processes and validates the public keys obtained from the RPKI cache or other approved authority, and generates all necessary pre-computed values for the public keys and the base point for each ECDSA or any other public key digital signature algorithm supported. Additionally, the system may check each one of its worker routines 705 using test parameters, generate and validate mock messages and generate health status reports. The contents of the NVMU 300 can be retained after the "Training and Self-Check Mode," since the NVMU 300 does not lose any data when it is turned off. Another mode could be labeled as the "Initialization Mode" whereas the system boots fresh, it populates all of its required opaque objects 801 for signature generation and verification, including Lookup Tables, asynchronous of other system or network activities. For BGPSEC, the secure signature and verification operations parallelizing manager 101 delivers adequate performance to start and populate its objects and converge within industry-accepted timeframe.

As will be understood by those familiar with the art, the subject matter described herein may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for fulfilling, at network line speed, multiple requests for signing paths and multiple requests for verifying paths, the multiple requests being received by a networking device, the method comprising:
   continuously and simultaneously receiving, by the networking device, a plurality of sign requests and a plurality of verify requests, per given period of time;
   continuously and simultaneously fulfilling received sign and verify requests at network line speed, by performing signature operations and verification operations according to a rule based configuration, wherein performing signature operations and verification operations according to the rule based configuration further comprises:
      breaking each one of the plurality of received sign requests and each one of the plurality of received verify requests into multiple tasks, and placing the multiple tasks originating from the pluralities of received requests into a task pool with specific per task priorities, according to the rule based configuration, wherein tasks in the task pool are disassociated from requests from which they originated and from other tasks;
      each of a plurality of execution agents repeatedly and simultaneously processing a next available task from the task pool based on priority, wherein each execution agent comprises a separate general purpose compute unit in the networking device, each execution agent having its own memory space and system resources;
      each of the plurality of execution agents containing at least one asynchronous worker routine configured for pre-generating values to be used in at least one higher level calculation performed during task processing, and for storing the pre-generated values in an opaque object in the memory space of its execution agent;
      each of the plurality of execution agents, upon completion of a task, placing status and output data concerning the completed task into a completed task repository and checking the task pool for a next available task based on priority; and
      processing results in the completed task repository to fulfil the pluralities of received requests.

2. The method of claim 1 wherein continuously and simultaneously receiving, by the networking device, a plurality of sign requests and a plurality of verify requests further comprises:
   continuously and simultaneously receiving, by the networking device, the plurality of sign requests and the plurality of verify requests, wherein the networking device does not have a priori knowledge of quantity, type, sequence, length, input data or frequency of the received requests.

3. The method of claim 1 wherein performing signature operations and verification operations according to a rule based configuration further comprises:
performing signature operations and verification operations according to at least one collection of rules defining types, characteristics, priorities and divisions for signature operations, for verification operations, and for at least some subtasks of signature and verification operations, according to at least one network protocol.

4. The method of claim 1 wherein each execution agent comprises a separate general purpose compute unit in the networking device, each execution agent having its own memory space and system resources further comprises:
each execution agent comprising a process or thread bound to a separate compute core.

5. The method of claim 1 wherein execution agents containing at least one asynchronous worker routine configured for pre-generating values to be used in at least one higher level calculation performed during task processing further comprises:
asynchronous worker routines embodied in the execution agents autonomously performing pre-calculations that result in pre-computed data to be used as inputs by higher-level functions during periods of time when no tasks are available in the task pool.

6. The method of claim 1 wherein execution agents containing at least one asynchronous worker routine configured for pre-generating values to be used in at least one higher level calculation performed during task processing, and for storing the pre-generated values in an opaque object in the memory space of its execution agent further comprises:
asynchronous worker routines embodied in the execution agents autonomously storing the pre-generated values in at least one opaque object in at least one non-volatile memory unit, such that the pre-generated values are persistently retained.

7. The method of claim 1 execution agents containing at least one asynchronous worker routine configured for pre-generating values to be used in at least one higher level calculation performed during task processing, and for storing the pre-generated values in an opaque object in the memory space of its execution agent further comprises:
asynchronous worker routines embodied in execution agents asynchronously pre-generating random numbers, re-coding the random numbers, evaluating their modular inverses, and storing the re-codings and modular inverses in opaque objects.

8. The method of claim 1 execution agents containing at least one asynchronous worker routine configured for pre-generating values to be used in at least one higher level calculation performed during task processing, and for storing the pre-generated values in an opaque object in the memory space of its execution agent further comprises:
asynchronous worker routines embodied in execution agents asynchronously calculating representations of base points, and storing the representations of base points in opaque objects.

9. The method of claim 1 execution agents containing at least one asynchronous worker routine configured for pre-generating values to be used in at least one higher level calculation performed during task processing, and for storing the pre-generated values in an opaque object in the memory space of its execution agent further comprises:
asynchronous worker routines embodied in execution agents asynchronously performing point multiplication operations using pre-generated re-codings of random numbers and pre-generated base points, and storing the products of the point multiplication operations in opaque objects.

10. The method of claim 1 execution agents containing at least one asynchronous worker routine configured for pre-generating values to be used in at least one higher level calculation performed during task processing, and for storing the pre-generated values in an opaque object in the memory space of its execution agent further comprises:
asynchronous worker routines embodied in execution agents asynchronously pre-generating at least some values used to generate public keys, and storing the at least some pre-generated values in opaque objects.

11. The method of claim 1 further comprising:
an asynchronous worker routine executing in the memory space of a specific execution agent randomly accessing and consuming an element of an opaque object in the memory space of the execution agent by:
generating a random number in the interval of one to the number of elements in the opaque object;
accessing the element of the opaque object corresponding to the generated random number; and
deleting the accessed element from the opaque object after access.

12. The method of claim 1 further comprising:
in response to receiving a request to verify a path with a number of segments exceeding a specific threshold, placing all tasks originating from the received request to verify the path with the number of segments exceeding the specific threshold into the task pool with per task priorities lower than other tasks in the task pool.

13. The method of claim 1 further comprising:
in response to receiving a request to verify a path with a number of segments exceeding a specific threshold, instructing a single execution agent to process at least all path segments exceeding the specific threshold.

14. The method of claim 1 further comprising:
applying intrusion detection functionality to received requests.

15. The method of claim 1 further comprising:
applying intrusion detection functionality to received requests according to configurable intrusion detection system rules.

16. The method of claim 1 wherein at least some opaque objects further comprise:
a plurality of elements, each element comprising a block of memory holding information defined without typecasts and at least one pointer to another element in the opaque object, wherein the elements of the opaque object are not located contagiously in memory.

17. The method of claim 1 wherein at least some opaque objects further comprise:
a plurality of elements, each element comprising a first block of memory holding a pointer to a second block of memory containing information defined without typecasts and at least one pointer to another element in the opaque object, wherein at least the second blocks are not located contagiously in memory.

18. The method of claim 1 wherein at least some opaque objects further comprise:
an array of pointers to elements, each element comprising a block of memory holding information defined without typecasts, wherein the elements of the opaque object are not located contagiously in memory.

19. At least one non-transitory computer readable-storage medium for fulfilling, at network line speed, multiple requests for signing paths and multiple requests for verifying paths, the multiple requests being received by a networking device, the at least one non-transitory computer readable-storage medium storing computer executable instructions that, when loaded into computer memory and executed by at least one processor of a computing device, cause the computing device to perform the following steps:

continuously and simultaneously receiving, by the networking device, a plurality of sign requests and a plurality of verify requests, per given period of time;

continuously and simultaneously fulfilling received sign and verify requests at network line speed, by performing signature operations and verification operations according to a rule based configuration, wherein performing signature operations and verification operations according to the rule based configuration further comprises:

breaking each one of the plurality of received sign requests and each one of the plurality of received verify requests into multiple tasks, and placing the multiple tasks originating from the pluralities of received requests into a task pool with specific per task priorities, according to the rule based configuration, wherein tasks in the task pool are disassociated from requests from which they originated and from other tasks;

each of a plurality of execution agents repeatedly and simultaneously processing a next available task from the task pool based on priority, wherein each execution agent comprises a separate general purpose compute unit in the networking device, each execution agent having its own memory space and system resources;

each of the plurality of execution agents containing at least one asynchronous worker routine configured for pre-generating values to be used in at least one higher level calculation performed during task processing, and for storing the pre-generated values in an opaque object in the memory space of its execution agent;

each of the plurality of execution agents, upon completion of a task, placing status and output data concerning the completed task into a completed task repository and checking the task pool for a next available task based on priority; and processing results in the completed task repository to fulfil the pluralities of received requests.

20. A networking device for fulfilling, at network line speed, multiple received requests for signing paths and multiple received requests for verifying paths, the networking device comprising:

at least one processor;

system memory;

a secure signature and verification operations parallelizing manager residing in the system memory, the secure signature and verification operations parallelizing manager being programmed to:

continuously and simultaneously receive a plurality of sign requests and a plurality of verify requests, per given period of time;

continuously and simultaneously fulfill sign and verify requests at network line speed, by performing signature operations and verification operations according to a rule based configuration, wherein performing signature operations and verification operations according to the rule based configuration further comprises:

breaking each one of the plurality of received sign requests and each one of the plurality of received verify requests into multiple tasks, and placing the multiple tasks originating from the pluralities of received requests into a task pool with specific per task priorities, according to the rule based configuration, wherein tasks in the task pool are disassociated from requests from which they originated and from other tasks;

each of a plurality of execution agents repeatedly and simultaneously processing a next available task from the task pool based on priority, wherein each execution agent comprises a separate general purpose compute unit, each execution agent having its own memory space and system resources;

each of the plurality of execution agents containing at least one asynchronous worker routine configured for pre-generating values to be used in at least one higher level calculation performed during task processing, and for storing the pre-generated values in an opaque object in the memory space of its execution agent;

each of the plurality of execution agents, upon completion of a task, placing status and output data concerning the completed task into a completed task repository and checking the task pool for a next available task based on priority; and processing results in the completed task repository to fulfil the pluralities of received requests.

* * * * *